(12) United States Patent
Maguire et al.

(10) Patent No.: US 12,338,027 B2
(45) Date of Patent: *Jun. 24, 2025

(54) ELASTOMERIC CONTAINER WITH INTEGRATED LEAK RESISTANT SEAL AND PRESSURE SHIELD

(71) Applicant: STASHER, INC., Emeryville, CA (US)

(72) Inventors: Paul Maguire, Goochland, VA (US); Katousha Ghaemi Nouri, Emeryville, CA (US); Angelo Carpinelli, Emeryville, CA (US); Bryan Kin Fo Au, Hong Kong (CN)

(73) Assignee: STASHER, INC.

( * ) Notice: Subject to any disclaimer, the term of this patent is extended or adjusted under 35 U.S.C. 154(b) by 0 days.

This patent is subject to a terminal disclaimer.

(21) Appl. No.: 18/538,588

(22) Filed: Dec. 13, 2023

(65) Prior Publication Data

US 2024/0109684 A1 Apr. 4, 2024

Related U.S. Application Data

(63) Continuation of application No. 17/382,742, filed on Jul. 22, 2021, now Pat. No. 11,878,834, which is a
(Continued)

(51) Int. Cl.
*B65D 6/24* (2006.01)
*B65D 33/25* (2006.01)

(52) U.S. Cl.
CPC ............ *B65D 11/188* (2013.01); *B65D 33/25* (2013.01)

(58) Field of Classification Search
CPC ...... B65D 11/188; B65D 33/25; B65D 75/22; B65D 75/322; B65D 33/2541; Y02W 30/80
(Continued)

(56) References Cited

U.S. PATENT DOCUMENTS

| 2,320,583 A | 6/1943 | Forro |
| 2,500,363 A | 3/1950 | Koeppel |

(Continued)

FOREIGN PATENT DOCUMENTS

| CN | 201325620 Y | 10/2009 |
| EP | 1238598 | 4/1998 |

(Continued)

OTHER PUBLICATIONS

Office Action for JP 2023-183789, dated Aug. 14, 2024, 4 pages.
(Continued)

*Primary Examiner* — Don M Anderson
*Assistant Examiner* — Eric C Baldrighi
(74) *Attorney, Agent, or Firm* — Quarles & Brady LLP

(57) ABSTRACT

A container is made of an elastomer such as silicone with a leak resistant seal and pressure shield. The seal includes the elastomer and is configured to open and close the elastomeric container. The seal includes bottom and top press-fit elements, a bottom pressure shield is disposed between the bottom press-fit element and an inner volume of the container, and a top pressure shield is disposed between the top press-fit element and the inner volume. Top and bottom enclosures of the container define a center horizontal plane where the top and bottom enclosures meet. In cross section, a thickness of the top pressure shield continuously increases along an entire top pressure shield inner surface, and, in cross section, a thickness of the bottom pressure shield continuously decreases along an entire bottom pressure shield inner surface beneath the center horizontal plane.

20 Claims, 25 Drawing Sheets

Related U.S. Application Data continuation of application No. 16/945,703, filed on Jul. 31, 2020, now Pat. No. 11,124,330, which is a continuation-in-part of application No. 16/783,318, filed on Feb. 6, 2020, now Pat. No. 11,873,143.

(58) Field of Classification Search
USPC ........................................................ 220/793
See application file for complete search history.

(56) References Cited

U.S. PATENT DOCUMENTS

| | | | |
|---|---|---|---|
| 2,613,421 A | 10/1952 | Madsen | |
| 2,637,085 A | 5/1953 | Madsen | |
| 2,674,289 A | 4/1954 | Silverman | |
| 2,777,181 A | 1/1957 | Morner | |
| 2,780,261 A | 2/1957 | Svec et al. | |
| 3,115,689 A | 12/1963 | Jacobs | |
| 3,149,747 A | 9/1964 | Burgess | |
| 3,280,870 A | 10/1966 | Bundy | |
| 3,326,399 A | 6/1967 | Ausnit | |
| 3,338,285 A | 8/1967 | Jaster et al. | |
| 3,417,675 A | 12/1968 | Ausnit | |
| 3,808,649 A | 5/1974 | Ausnit | |
| 3,945,403 A | 3/1976 | Noguchi | |
| 3,948,705 A | 4/1976 | Ausnit | |
| 4,159,728 A | 7/1979 | Kraus et al. | |
| 4,199,845 A | 4/1980 | Ausnit | |
| 4,341,575 A | 7/1982 | Herz | |
| 4,397,404 A | 8/1983 | Blanchette | |
| 4,512,474 A | 4/1985 | Harding | |
| 4,561,108 A | 12/1985 | Kamp | |
| 4,736,496 A | 4/1988 | Fisher et al. | |
| 4,842,670 A | 6/1989 | Callis et al. | |
| 4,845,781 A | 7/1989 | Strickland et al. | |
| 4,925,318 A | 5/1990 | Sorensen | |
| 4,929,487 A | 5/1990 | Tilman et al. | |
| 5,000,363 A | 3/1991 | Linquist | |
| 5,017,021 A | 5/1991 | Simonsen et al. | |
| 5,031,768 A | 7/1991 | Fischer | |
| 5,046,659 A | 9/1991 | Warburton | |
| 5,067,208 A | 11/1991 | Herrington et al. | |
| D323,979 S | 2/1992 | Forman et al. | |
| 5,094,707 A | 3/1992 | Bruno | |
| 5,123,535 A | 6/1992 | Patnode et al. | |
| 5,161,286 A | 11/1992 | Herrington et al. | |
| 5,235,731 A | 8/1993 | Anzai et al. | |
| 5,238,306 A | 8/1993 | Heintz et al. | |
| 5,351,369 A | 10/1994 | Swain | |
| 5,486,051 A | 1/1996 | May | |
| 5,577,305 A | 11/1996 | Johnson | |
| 5,584,408 A | 12/1996 | Orkisz | |
| 5,665,301 A | 9/1997 | Alanko | |
| 5,686,304 A | 11/1997 | Codner | |
| 5,709,915 A | 1/1998 | Tomic et al. | |
| 5,729,876 A | 3/1998 | Johnson | |
| 5,802,677 A | 9/1998 | Dorman et al. | |
| 6,305,844 B1* | 10/2001 | Bois ................... | B65D 33/2508 24/399 |
| 6,420,037 B1 | 7/2002 | Tsuji et al. | |
| 6,609,827 B2 | 8/2003 | Bois | |
| 6,625,955 B2 | 9/2003 | Aylward | |
| 6,632,164 B1 | 10/2003 | Warburton-Pitt | |
| 6,761,481 B1 | 7/2004 | Bois | |
| 6,786,712 B2 | 9/2004 | Cisek | |
| D512,650 S | 12/2005 | Dapsance | |
| 7,241,046 B2 | 7/2007 | Piechocki | |
| 7,291,370 B2 | 11/2007 | Gipson et al. | |
| 7,316,052 B2 | 1/2008 | Pawloski et al. | |
| 7,585,111 B2 | 9/2009 | Turvey et al. | |
| 7,681,732 B2 | 3/2010 | Moehlenbrock et al. | |
| 7,891,514 B1 | 2/2011 | Walsh et al. | |
| 7,904,996 B2 | 3/2011 | Dobreski et al. | |
| 8,157,123 B2 | 4/2012 | Tucker et al. | |
| D724,441 S | 3/2015 | Fukuda | |
| 9,156,593 B2 | 10/2015 | Schreiter et al. | |
| 9,371,153 B1* | 6/2016 | Nouri ..................... | B65D 75/22 |
| 10,407,217 B1 | 9/2019 | Nouri et al. | |
| 2003/0215163 A1 | 11/2003 | Schneider et al. | |
| 2003/0228078 A1 | 12/2003 | Clune et al. | |
| 2004/0134166 A1 | 7/2004 | Ausnit | |
| 2004/0136617 A1 | 7/2004 | Gerrits | |
| 2004/0144781 A1 | 7/2004 | Dees et al. | |
| 2005/0247709 A1 | 11/2005 | Atkins et al. | |
| 2006/0034551 A1 | 2/2006 | Linneweil | |
| 2006/0083833 A1 | 4/2006 | Pezzana et al. | |
| 2006/0289550 A1 | 12/2006 | Guardigli | |
| 2007/0095848 A1 | 5/2007 | Galland et al. | |
| 2007/0183692 A1 | 8/2007 | Pawloski | |
| 2008/0118609 A1 | 5/2008 | Harlfinger | |
| 2009/0110335 A1* | 4/2009 | LeBoeuf ............ | B65D 33/2508 383/42 |
| 2009/0134179 A1 | 5/2009 | Kidd et al. | |
| 2009/0134180 A1 | 5/2009 | Kidd | |
| 2009/0223966 A1 | 9/2009 | Kidd et al. | |
| 2010/0218690 A1 | 9/2010 | Huber et al. | |
| 2011/0038564 A1 | 2/2011 | Slansky | |
| 2011/0042407 A1 | 2/2011 | Steele | |
| 2011/0103717 A1 | 5/2011 | Kasai | |
| 2011/0268373 A1 | 11/2011 | Polland | |
| 2012/0008880 A1 | 1/2012 | Toth | |
| 2012/0037618 A1 | 2/2012 | Perez | |
| 2012/0106874 A1 | 5/2012 | Pawloski | |
| 2012/0152943 A1 | 6/2012 | Leoncavallo et al. | |
| 2013/0091667 A1 | 4/2013 | Zerfas et al. | |
| 2013/0105352 A1 | 5/2013 | Munguia | |
| 2014/0270579 A1 | 9/2014 | Nouri | |
| 2014/0270587 A1 | 9/2014 | Schreiter et al. | |
| 2016/0031609 A1 | 2/2016 | Tseng et al. | |
| 2018/0029324 A1 | 2/2018 | Cobler | |
| 2018/0251267 A1 | 3/2018 | Finell | |
| 2021/0347525 A1* | 11/2021 | Maguire ............ | B65D 33/2541 |

FOREIGN PATENT DOCUMENTS

| | | |
|---|---|---|
| EP | 0958909 | 11/1999 |
| EP | 0958909 A1 | 11/1999 |
| EP | 1132310 A2 | 9/2001 |
| FR | 2302247 | 9/1976 |
| FR | 2302247 A1 | 9/1976 |
| GB | 1549021 A | 8/1979 |
| JP | S56-147985 | 11/1981 |
| JP | H08217093 | 8/1996 |
| JP | 2001031138 | 2/2001 |
| JP | 2001031138 A | 2/2001 |
| JP | 2008056279 | 3/2008 |
| JP | 2010168098 | 8/2010 |
| JP | 2010168098 A | 8/2010 |
| JP | 2015016018 | 1/2015 |
| TW | 495474 B | 7/2002 |
| WO | 2014163712 | 10/2014 |
| WO | 2016140976 A1 | 9/2016 |
| WO | 2021/159067 A1 | 8/2021 |

OTHER PUBLICATIONS

International Search Report and Written Opinion for PCT/US2021/017074, mailed May 21, 2021. (12 pages).
Notice of Allowance from Taiwan Patent Application No. 110104420, mailed Apr. 26, 2022 (6 pages).
Office Action in JP 2022-547985 dated May 24, 2023, 3 pages.
Office Action in TW 11119602 dated Sep. 26, 2023, 7 pages.
International Preliminary Report on Patentability Received in PCT Application Serial No. PCT/US16/20279, Sep. 14, 2017, 10 pages.
Extended Search Report issued in EP16759364.9, dated Sep. 26, 2018, 8 pages.
Office Action issued in JP2017-546909, dated Jan. 29, 2020 (7 pages), and corresponding English Translation (6 pages).
Examination Report issued in AU2016226375, dated Feb. 4, 2020, 4 pages.
Response to Examination Report dated Apr. 17, 2020 (22 pages).
Annex A: Commercial embodiments of Munguia, 3 pages, Undated.

(56) References Cited

OTHER PUBLICATIONS

Engineers Edge, Coefficient of friction values for various materials, retrieved from https://www.engineersedge.com/coefficients_of_friction.htm on Apr. 17, 2020 (4 pages).
Professional Plastics, Coefficient of friction for a large number of different types of plastics, undated (4 pages).
Annex G: Granted Canadian Claims (CA2999323/ Jan. 17, 2020) based off PCT/US2016/020279.
Annex H: Granted Chinese Claims (English Translation) (2020).
Annex I: Applicant's commercial product discussed in view of the current claims, undated (5 pages).
International Search Report Received in PCT Application Serial No. PCT/US14/00032, dated Jul. 30, 2014, 1 page.
International Search Report Received in PCT Application Serial No. PCT/US16/20279, Mar. 1, 2016, 12 pages.
International Search Report Received in PCT Application Serial No. PCT/US2019/061455, dated Jan. 14, 2020, 7 pages.
Supplementary European Search Report received in EP16759364, dated Sep. 26, 2018, 8 pages.
Zip Top, LLC v. Stasher, Inc. Patent Owner Response to Petition for Inter Partes Review of U.S. Pat. No. 9,371,153, filed on Apr. 22, 2019, in IPR2018-01216.
Zip Top, LLC v. Stasher, Inc. Petition for Inter Partes Review of U.S. Pat. No. 9,371,153, filed on Jun. 6, 2018, as IPR2018-01216, 89 pages.
Zip Top, LLC v. Stasher, Inc. Patent Owner Preliminary Response for Inter Partes Review of U.S. Pat. No. 9,371,153, filed on Oct. 19, 2018 in IPR2018-01216.
Zip Top, LLC v. Stasher, Inc. Patent Owner Supplemental Preliminary Response for Inter Partes Review of U.S. Pat. No. 9,371,153, filed on Nov. 20, 2018 in IPR2018-01216.
Declaration Of Paul Koch, Ph.D. In Support Of Petition For Inter Partes Review (IPR2018-01216), (136 pages) and Curriculum Vitae in Support thereof (17 pages).
Rehak, Melanie, "Who Made that Ziploc Bag", The New York Times Magazine dated Jul. 25, 2014.
"Handbook of molded and extruded rubber", Goodyear Tire and Rubber Company, Akron (1949), retrieved from http://hdl.handle.net/2027/mdp.39015002005448.
Correspondence from Robert F. Kramer of Dentons US LLP to Mr. R. William Beard, Jr. of Slayden Grubert Beard PLLC, dated Apr. 9, 2018 in re Stasher, Inc.—Zip Top LLC, 5 pages.
Correspondence from R. William Beard, Jr. of Slayden Grubert Beard PLLC to Danna J. Cotman, Esq. of ARC IP Law, PC dated Mar. 16, 2018 in re "Stasher Patents", 16 pages.
Correspondence from Danna J. Cotman of ARC IP Law, PC to Rebecca Finell, dated Mar. 9, 2018 in re "Notification of Intellectual Property Rights", 2 pages.
"Stasher Monthly Gross Sales" for the years 2016 through 2018, 2 pages.
Correspondence from reddot design award to Stasher, Inc. in re "Your Success in the Red Dot Award: Product Design 2016", Mar. 2016, 3 pages.
"Global Innovation Awards" 2016 Winner Plaque (1 page) and Photograph of plaque being presented (1 page).
Original Complaint filed in the United States District Court for the Western District of Texas, Austin Division in Civil Action No. 1:18-cv-00276 (Zip Top, LLC and Finell Co., LLC v. Blue Avocado Co.) on Apr. 2, 2018, 30 pages.
"Zip Top Containers" retrieved from https://vimeo.com/259047617 (3 pages).
"Elastomer: chemical compound", Encyclopedia Britannica, retrieved from https://web.archive.org/web/20150704001810/https://www.britannica.com/science/elastomer (5 pages).
Shark Tank Season 9 Episode 15—Stasher Segment (24 pages) and Segment Offset Summary (1 page); Undated.
"IHA Announces Finalists for Global Innovation Awards for Product Design", Press Release International Housewares Association, Feb. 17, 2016, 4 pages.
S9 E15 Episode 15, ABC Episode Summary, retrieved from https://abc.go.com/shows/shark-tank/episode-guide/season-09/15-episode-15 (2 pages).
The American Heritage College Dictionary, Third Edition, 1997 (8 pages).
Declaration Robert M. Kimmel in Support of Patent Owner Response to Inter Partes Review (IPR2018-01216), 56 pages.
Declaration of Katousha Nouri in Support of Patent Owner Response to Petition for Inter Partes Review (IPR2018-01216), 7 pages.
Declaration of Katousha Nouri in Support of Patent Owner Preliminary Response to Petition for Inter Partes Review (IPR2018-01216), dated Oct. 16, 2018, 6 pages.
Declaration of Paul Maguire in Support of Patent Owner Response to Petition for Inter Partes Review (IPR2018-01216), 17 pages.
Declaration of Haley Haggerstone in Support of Patent Owner Response to Petition for Inter Partes Review (IPR2018-01216), 5 pages.
Declaration of Toby Thomas in Support of Patent Owner Response to Petition for Inter Partes Review (IPR2018-01216), 88 pages.
"Pre-Order Zip Tops on Kickstarter", newsletter dated Oct. 1, 2018 (2 pages).
Internal Stasher, Inc. Email Correspondence in re "½ gallon price competition on Amazon" dated Jun. 15, 2018 through Jul. 9, 2018, 26 pages.
"Ziploc Brand Freezer Bags" Product Listing retrieved from www.watsinsidescjohnson.com/us/en/brands/ziploc/ziploc-brand-freezer-bags, 2 pages.
Email Correspondence from Susan Cassar of Wacker Chemical Corporation in re: "Stress/strain curve legend", dated Apr. 10, 2019, 1 page.
Decision Institution of Inter Partes Review, (IPR2018-01216), 39 pages.
"National Certification in Plastics Study Guide", The Society of the Plastics Industry (SPI), Inc., published by Hanser Publishers, Munich (2000), 5 pages.
"Guide to Plastics Property and Specification Charts", by the Editors of Modern Plastics Encyclopedia (1974) 8 pages.
Polymer Data Handbook by Oxford University Press, Inc. (1999), 1102 pages.
Bhowmick, Anil, "Mechanical Properties of Polymers", Encyclopedia of Life Support Systems, 16 pages.
Meltzer, et al., "The Influence of Fillers and Degree of Vulcanization on the Mechanical Properties of Hard Rubber Polyblends", vol. 8 pp. 773-789 (1964).
Wang, et al., "Influence of Prolonging Vulcanization on the Structure and Properties of Hard Rubber", The University of South Australia (2007) 11 pages.
Rosato, Dominick, "Rosato's Plastics Encyclopedia and Dictionary", Hanser Publishers (1993) 8 pages.
Soroka, Walter, "Illustrated Glossary of Packaging Terminology" (2008) 5 pages.
Billmeyer, Fred, "Textbook of Polymer Science", Interscience Publishers (1962), 4 pages.
Whittington, Lloyd, "Whittington's Dictionary of Plastics", Technomic Publishing Co. (1978), 5 pages.
Stasher Website Acclaim, 16 pages, Undated.
Oral Deposition of Paul Edward Koch, dated Apr. 11, 2019 conducted in Case No. IPR2018-01216 (91 pages).
Hamilton, James, "An Overview of Silicone Rubber", published Jun. 1, 2003 (7 pages).
"Standard Terminology Relating to Plastics", ASTM International (2019), retrieved Apr. 9, 2019, 17 pages.
International Standard 1382 Rubber Vocabulary, retrieved Apr. 15, 2019, 132 pages.
Original Schematic re "Tortous Path".
Stasher Seal Cross Section, Undated, 1 Page.
Stasher, Inc. listing of Accolades, Undated, 3 Pages.
"U.S. Population: How many plastic freezer, sandwich or storage bags have you used in the last 7 days", Statista (2018 Data), 2 pages.
Parker, Laura, "Fast Facts about Plastic Pollution", National Geographic, Dec. 20, 2018, 10 pages.
"Excellence in Housewares Awards 2018" program for event held in Royal Lancaster London on Oct. 3, 2018, 2 pages.

(56) References Cited

OTHER PUBLICATIONS

"Thirteen Companies Honored with IHA Global Innovation Awards for Product Design", International Housewares Association, dated Mar. 3, 2019, (2 pages) and photograph of plaque presentation (1 page).
"About the International Housewares Association—IHA", https://www.housewares.org/iha/default.
"2019 IHA Global Innovation Award Global Honorees and Finalists", Undated, 8 pages.
LyondellBasell Petrothene NA940085 Low Density Polyethylene (Film Grade) Properties Specification, Undated, 4 pages.
"Easy Zipper Audit", Undated, 1 page.
"Zip Top Containers are all you need" Undated, 1 page.
"Keep America Beautiful", Wikipedia.org, Undated, 6 pages.
"Frequently Asked Questions" retrieved https://ziptop.co/apps/help-center#!im-a-blogger-can-i-get-a-sample-to-review, retrieved Mar. 9, 2018, 3 pages.
"Red Dot", Wikipdia.org, retrieved from https://en.Wikipedia.org/wiki/red_dot, undated, 3 pages.
Baron, Abigail, et al., "The 7 most brilliant product designs of 2016", Inc. Magazine, Undated, 9 pages.
Hill, Danielle, "What are Ziploc Brand Bags Made of", Leaf Group Ltd, Undated, 6 pages.
"A Hard Character", Wacker Chemie AG, retrieved Apr. 2, 2019, 4 pages.
"Hardly any Strain Under Stress" Diagram, Undated, 1 page.
"Standard Terminology Relating to Rubber", ASTM Intl., Retrieved on Apr. 2, 2019, 17 pages.
"Overview of Materials for Ethylene Vinyl Acetate Copolymer, Film Grade", MatWeb Material Property Data, retrieved from http://www.matweb.com/search/datasheetText.aspx?bassnum=O4107 on Apr. 6, 2019, 2 pages.
DIE 299 45% HDPE (.103 Width) Track Specifications, Dated Jul. 26, 1999, 2 pages.
DIE 324 (2044-2001) Bolthouse Carrot Tamper Evident Specifications, Dated Jul. 14, 1999, 1 page.
Judgment Terminating the Proceeding issued in Case IPR2018-01216 (4 pages).
Consolidated Markman Briefing filed in Civil Action No. 6:18-cv-312 on May 14, 2019, 147 pages.
Declaration of Toby Thomas in Support of Plaintiff's Opening Claim Construction Brief (Civil No. 6:18-cv-312), filed May 14, 2019, 13 pages.
Declaration of Robert Kimmel in Support of Plaintiff's Opening Claim Construction Brief (Civil No. 6:18-cv-312), filed May 14, 2019, (27 pages), and Curriculum Vitae in Support thereof (9 pages).
Declaration of Paul Koch in Regarding Claim Construction Issues (Civil No. 6:18-cv-312), filed May 14, 2019, 11 pages.
"The Compact Oxford English Dictionary—2$^{nd}$ Edition", Clarendon Press—Oxford; 5 pages.
"Webster's Ninth New Collegiate Dictionary", Merriam-Webster, Inc. (1988), 4 pages.
Joint Claim Construction Statement filed in Civil Action No. 6:18-cv-312, on May 14, 2019, 6 pages.
Claim Construction Order filed in Civil Action No. 6:18-cv-312, on Jun. 19, 2019, 10 pages.
Initial Claim Construction Order filed in Civil Action No. 6:18-cv-312, on Jun. 7, 2019, 3 pages.
First Amended Answer and Counterclaims, filed in Civil Action No. 6:18-cv-312, on May 27, 2019, 17 pages.
"Copycat 2" undated images, 4 pages.
"Copycat 3" images of samples purchased Mar. 2019, 6 pages.
"Copycat 4", retrieved from alibaba.com, Undated, 3 pages.
Communication pursuant to Rules 70(2) and 70a(2) EPC issued in EP16759364.9, dated Oct. 12, 2018 (1 page), and response thereto dated Apr. 18, 2019 (3 pages).
Examination Report (Communication pursuant to Article 94(3) EPC) issued in EP16759364.9, dated Jun. 17, 2019 (5 pages), and response thereto dated Oct. 14, 2019 (8 pages).
Examination Report (Communication pursuant to Article 94(3) EPC) issued in EP16759364.9, dated Nov. 26, 2019 (4 pages); and response thereto (22 pages), including claims (original and marked-up); Annex 1 (5 pages).
Annex A to Examination Report Response in EP16759364.9, "Example 1: Redrocket Silicone Food Storage Bag" at https://tinyurl.com/s225yz6. (3 pages).
"Coefficient of Friction Equation and Table Chart—Engineers Edge", webpage retrieved from www.engineersedge.com/coefficients_of_friction.htm; retrieved on Apr. 17, 2020 (4 pages).
"Mechanical Properties of Plastic Materials", published by Professional Plastics, https://www.professionalplastics.com/professionalplastics/MechanicalPropertiesofPlastics.pdf Accessed Apr. 17, 2020 (4 pages).
Examination Report (Communication pursuant to Article 94(3) EPC) issued in EP16759364.9, dated Jun. 24, 2020 (4 pages).
Office Action Input and Amended Claims filed in response to Office Action dated Jan. 29, 2020 issued in JP2017-546909, and English Translation.
Office Action issued in KR 10-2017-7028124, mailed Jun. 25, 2020 (10 pages) and English Translation thereof (10 pages).
Office Action filed in KR 10-2017-7028124, dated Aug. 25, 2020 (14 pages), Claim Amendments and English Translation thereof.
Examination Report Response filed in AU2016226375, dated Sep. 2, 2020, 29 pages, and Statement of Proposed Amendments (20 pages).
Notice of Allowance received in AU2016226375, dated Oct. 2, 2020 (4 pages).
Office Action issued in CA2999323, dated Jan. 24, 2020 (4 pages).
Office Action Response filed in CA2999323, dated Feb. 18, 2020 (39 pages).
Notice of Allowance issued in CA2999323, dated Apr. 1, 2020 (1 page).
Certificate of Patent issued in CA2999323, dated Jun. 9, 2020 (49 pages).

* cited by examiner

ELASTOMERIC CONTAINER WITH INTEGRATED LEAK RESISTANT SEAL AND PRESSURE SHIELD

CROSS REFERENCE TO RELATED APPLICATIONS

This application is a continuation application of U.S. Utility patent application Ser. No. 17/382,742, filed on Jul. 22, 2021, which is a continuation application of Ser. No. 16/945,703, filed on Jul. 31, 2020, which is a continuation-in-part application of U.S. Utility patent application Ser. No. 16/783,318, filed on Feb. 6, 2020, the contents of which are hereby incorporated herein by reference in their entirety.

BACKGROUND OF THE INVENTION

1. Field of the Invention

One or more embodiments pertain to the field of storage and transport bags and containers and to seals for these bags and containers. More particularly, but not by way of limitation, one or more embodiments enable a shaped elastomeric bag with an integrated leak resistant seal and pressure shield. Embodiments may be used for storage, transport, and cooking of food, including liquids, and for other applications. Embodiments may be durable and reusable. Embodiments of the invention incorporate a leak resistant seal to provide enhanced sealing with a mechanism that is integrated into the container and a pressure shield that improves the leak resistance of the seal and container by at least 300% in some embodiments and at least 400% in other embodiments over a container having a leak resistant seal without a pressure shield, for example when contents of the bag exert pressure against the seal, such as when the bag is squeezed or compressed or dropped. This significant improvement is unexpected as the pressure shield makes up a small percentage of the overall container by weight and the pressure shield elements not make up part of the interlocking leak resistant seal elements. One or more embodiments of the container includes an outer hole also known as a connection hole that enables coupling the embodiments to another object, for example through the use of a carabiner or other device.

2. Description of the Related Art

Sealable bags and containers are well known in the art. For example, Ziploc® plastic bags have a zipper-like sealing mechanism integrated into the opening of the bag. More recent innovations have modified sealable bags to be more durable and to be more suitable for reuse, some of which are based on silicone materials. For example, both Munguia in US Patent Publication 2013/0105352 and LeBoeuf in US Patent Publication 2009/0110335 teach silicone food storage bags with seals.

LeBoeuf discloses a seal with a track and groove, but specifically notes that an additional mechanical clasp may be needed as an added method of closure. Hence the integrated sealing portion of the container disclosed in LeBoeuf is not intended to be leak resistant without use of external clasping members.

A limitation of the existing sealable bags is that the integrated seal designs provide relatively weak sealing force based on the elastic nature of elastomers. Plastic bags provide a weak sealing force, but for a different reason, mainly because seals are so small wherein the rigid plastic material utilized in the seals is formed into ridges that are approximately 10 times thinner than a human fingernail, i.e., 0.1 mm. For example, Ziploc® bags are closeable, but they do not have a high leak resistance. This lack of leak resistance is a consequence of the relatively small sealing area and the simple track and groove shapes of the Ziploc® seal. To make the ridges leak resistant for storage and—for undergoing internal forces that open the seal from the inside of the container, i.e., when the container squeezed or dropped, the rigidity of the seal, when made this small has to be outside of the hardness scale known as the Shore A scale and well into the Shore D scale, i.e., 45-85 Shore D, typically in the 45-60 Shore D range and usually above 50 Shore D. In addition, extrusion imperfections when making the seals with this rigidity yield slight variations in the thickness of the seal and this provides a lower yield of containers that have acceptable leak resistance. Attempts to make the seals strong require use of sliders to open and close the bags, i.e., to allow children or elderly or weak individuals to open and close the bags. Sliders generally provide an opening on the end of the slider that leaks. In these devices, extra structure must be utilized to form a seal around the portion of the slider that maintains a separation in the seal, i.e., to seal the slider portion itself from leaking. Sliders also provide a choking hazard for children when they are dislodged.

This difficulty in providing an integrated leak resistant seal was taught in 1946 by Koeppel in U.S. Pat. No. 2,500,363. As Koeppel states: "Closures for containers of this nature have been formed in various ways, but when the opening in the bag or container is made sufficiently large to receive ice cubes or relatively large lumps of ice it is difficult to seal the opening effectively. Efforts have been made to overcome this difficulty by providing the container with a thickened portion about the mouth of the opening with complementary zigzag or tongue and groove surfaces to form a seal. However, even such constructions are ineffective to prevent leakage unless they are pressed together with considerable force." Koeppel then teaches a design using an external mechanical clip attached to a bag to provide the necessary sealing force. In this sense Koeppel arrives at a similar solution to LeBoeuf using an external clasp.

Other attempts to make a silicone container with a leak resistant seal have failed including U.S. Patent Application Publication No. 2014/0270579, to Nouri, i.e., one of the instant inventors, also published as WO 2014/163712. The '579 publication includes a seal that readily leaks on both ends when configured without a "tightening mechanism" attached at both ends of the seal.

Silverman, U.S. Pat. No. 2,674,289 teaches a rubber container, namely a tobacco pouch that is molded inside out. This eliminates the step of bonding a seal to the container and simplifies the mold since the container can be inverted after molding. However, Silverman's seal tapers at the ends and when inverted for use, results in a complete lack of sealing force at the ends since the seal tapering produces no contact for ridges and indentations at the ends of the seal i.e., no seal at the ends. Silverman's design thus requires rivets, leather jacketing and a separate zipper e.g., external structures, to hold the seal together. Silverman also requires extra manufacturing steps of riveting the ends of the seal, etc., and is not leak resistant unless the external structure, e.g., rivets, are utilized.

While use of external clips or mechanical clasps can provide seals, they are less convenient for the user and they require additional manufacturing cost and complexity.

U.S. Pat. No. 2,780,261 to Svec is directed at flat plastic bags with airtight moisture resistant seals as taught at Col. 1:15-18. Svec also teaches only one embodiment that is intended to be utilized to hold liquid. This liquid holding embodiment is shown at FIG. 7 of Svec and is the only embodiment that is intended to hold liquid (not moisture) inside when an internal pressure forces the seal open, for example when external pressures are applied to the container, i.e., squeezed or dropped. Svec teaches the extra critical structure required to hold liquid as follows at Col. 7:15:31, i.e., to keep fluid inside the container from leaking. As shown in annotated FIG. 15A, the orange and red portions of seal 1510 as illustrated, i.e., 1511 and 1512, are required to keep pressure on the seal to provide liquid leak resistance. The amount of material required in Svec is approximately double the amount of material utilized in embodiments of pressure shield detailed herein with respect to one or more embodiments of the invention. Another disadvantage of Svec is that these locations in the internal volume of the container that are required to keep pressure on the seal to hold it together and keep it from leaking are areas where food and/or liquid is trapped, and hard to clean in these areas and a potential trap for bacteria. The green annotation on Svec (annotated in the '261 Patent as 13 and 14) and the Applicant's prior art and embodiments of the invention (annotated as 101 and 102) are the portion of the containers below the seal in each case. Blue represents liquid, namely 1500 in the three FIGS. 15A, 15B, and 15C.

FIG. 15B is disclosed in Applicant's own prior patent, namely U.S. Pat. No. 9,371,153. The '153 patent does not contemplate the portions 1501 and 1502 shown in FIG. 15C that increase the leak resistance by at least 400% with an overall extra amount of material utilized that amounts to approximately 5% in some embodiments of the invention, depending on the size. The pressure shield, for example the material between the seal and the inside of the container, produces the unexpected result of at least a 300% increase in some embodiments and 400% increase in other embodiments in the leak resistance as documented in FIGS. 19A-B, again by adding a very small amount of extra material in the form of a pressure shield and this pressure shield was not contemplated by the instant inventors in the '153 Patent. FIG. 19A shows a drop height of approximately 4 inches in the left image and the resulting break in the seal and leak on the right-side image, i.e., for prior art embodiment shown in FIG. 15B. Embodiments of the invention shown in FIG. 15C provide at least a 4 factor increase in drop height without leaking, e.g., when dropping from at least 16 inches as shown in the images in FIG. 19B, with time increasing to the right in FIGS. 19A-B, which is not possible with the prior art embodiment shown in FIG. 15B.

Based on the limitations in the prior art, there is therefore a need for an elastomeric container with an integrated leak proof seal and pressure shield, which does not require such additional elements to enhance sealing force and which provides a much higher level of leak resistance with minimal extra material, which is easy to clean and is reusable.

BRIEF SUMMARY OF THE INVENTION

Embodiments of the invention enable a shaped elastomeric container with an integrated leak resistant seal and pressure shield. Such a container may be used for example to store and transport liquids or solids or both, including food products. Embodiments of the invention may be of various shapes and sizes, including but not limited to rectangular, square, circular, trapezoidal, cylindrical, elliptical, polygonal, cubical, or any convenient shape for the intended use of the container. Embodiments of the invention utilize elastomers among their materials to provide properties such as flexibility, heat-resistance, microbial resistance, and ease of manufacturing. Other materials may be used as well for shaping, strengthening, decorating, or any other purpose. Some embodiments may employ silicone as one of the elastomers in the container. Silicone offers several potential advantages including non-toxicity, stick resistance, ability to be heated such as in an oven, ability to be frozen as in a freezer, and ability to be molded into various shapes in manufacturing processes. One or more embodiments of the container comprise an outer hole also known as a connection hole that enables coupling the embodiments to another object, for example through the use of a carabiner or other device.

Embodiments of the invention may include two parts of an enclosure, referred to as the top enclosure and the bottom enclosure. The top enclosure and bottom enclosure may be joined along some of their edges to form a container with an opening. The edge nearest the opening is referred to herein as the front edge; the edge opposite the front is referred to as the back edge. The edges running between the back and front are referred to as the left edge and the right edge. The joints between the parts of the enclosure may be made of an elastomer as well or may be made of other materials. Any joining technique such as molding, gluing, taping, sewing, stapling, welding, or any other technique may be used to form the enclosure. The enclosure may partially surround an inner volume designed for the storage or transport of materials inside the container. In some embodiments the container may be sufficiently rigid so that this inner volume is present even when the container is empty. In other embodiments the container may be designed to collapse when empty so that the inner volume is not apparent unless items are inside the container.

Embodiments may have one or more edges of the enclosures fully or partially open for the insertion and removal of materials. Adjacent to or proximal to these open edges, embodiments may include a seal designed to close off the inner portion of the container that is utilized to open and close the container. In some embodiments the seal includes two elements called press-fit elements that are designed to press together and seal when closed. The press-fit elements are referred to herein as the top press-fit element and the bottom press-fit element. They may be located anywhere on the container where it is necessary or convenient to provide a seal. These press-fit elements may have complementary profiles that come together at a common boundary when the elements are pressed together. Various embodiments of the invention employ designs for the press-fit elements that contribute to the strength of the seal. In some embodiments the seal is designed for leak resistance. For example, some embodiments provide a seal that can hold one to two cups of water inside the container without leaking, even when the container is inverted with the seal pointing downwards.

In one or more embodiments of the invention, the leak resistant seal includes a first seal portion and a second seal portion that couple with each other along a boundary to seal the container and decouple from each other along the boundary to open the container.

In one or more embodiments the leak resistance of the seal is enhanced by utilizing sufficient material thickness in the press-fit elements. In at least one embodiment of the invention, the first seal portion and the second seal portion are at least 1 mm thick, or at least 2 mm thick, or at least 3 mm thick, or greater than 3 mm thick, as maximums as opposed to average thicknesses. Thicker material in the press-fit elements can increase the sealing force of the seal. In some embodiments the average material thickness of both the upper press-fit element and the lower press-fit element is at least 0.25 cm, in other embodiments, any value up to 0.5 cm, in other embodiments any value between 0.5 cm and 0.75 cm and in other embodiments 1.0 cm, when measured across the common boundary between the press-fit elements. Specifically, to calculate the average thickness across the seal, i.e., from the first point of contact and the last point of contact in the seal, which may include one or more gaps, defines the width of the seal. The area of each portion of the male and female press-fit elements is added up by placing a grid over the cross section of the seal and counting the number of squares between the starting point of contact of the seal and the ending point of contact of the seal. Dividing the area by the width yields the average thickness of the seal. Other embodiments may use even thicker material for greater sealing. Some embodiments do not rely on material thickness as a major factor for sealing strength, but instead or in addition use the shape of the press-fit elements to create enhanced leak-resistance.

In one or more embodiments of the invention the front edge of the enclosure may be longer than the back edge. For example, a container may be roughly trapezoidal in shape with the front edge longer than the back edge. Such embodiments may provide a benefit of a larger opening area for the insertion and removal of materials. This benefit may be particularly valuable when the press-fit elements of the seal utilize thick material, since the opening may pinch together at the left and right edges.

In one or more embodiments, the top press-fit element and the bottom press-fit element have one or more male or female elements that mate together to form part of the seal. Different embodiments may employ any convenient shapes, sizes, and numbers for these male and female elements. In some embodiments either the top press-fit element or the bottom press-fit element, or both, may have a vertical protrusion extending upward or downward into a corresponding cavity on the other press-fit element. In some embodiments one or more of the vertical protrusions may have one or more horizontal ridges emerging horizontally from the vertical protrusion. These ridges may be implemented to lock into place into corresponding indentations on the opposite press-fit element. Some embodiments use at least two horizontal ridges attached to a single vertical protrusion, spaced out vertically at different heights, to provide additional sealing force. Other embodiments may use only a single horizontal ridge, or no horizontal ridges. The shapes and sizes of the vertical protrusion and the horizontal ridges, if present, may differ across embodiments. For example, horizontal ridges may be triangular, circular, elliptical, square, rectangular, or any other shape extending horizontally from a vertical protrusion. In some embodiments a vertical protrusion may be at least 0.2 cm, e.g., 80%, or any other percentage of the overall thickness of the upper and lower press-fit elements, in other embodiments, any value between 0.4 cm and 0.6 cm and in other embodiments 0.8 cm tall. In some embodiments a horizontal ridge may be at least 0.1 cm wide or any other width, including any value greater than 0.1 cm, such as 0.2 cm or wider.

To achieve a leak resistant seal, one or more embodiments of the invention may incorporate press-fit elements of substantial size and material thickness. Such designs present a potential challenge in that the sealing elements may extend a considerable distance away from the top and bottom enclosures. To mitigate this effect, one or more embodiments of the invention may offset the top and bottom press-fit elements so that they are more centered along the horizontal plane of the container. In particular, in one or more embodiments, the top press-fit element or the bottom press-fit element, or both, may have cavities and protrusions that extend both above and below the center horizontal plane between the top and bottom enclosures. For example, a bottom press-fit element might have cavities below the center horizontal plane, and a vertical protrusion that extends above the center horizontal plane. Thus, one or more embodiments enable containers with leak resistant seals that have sealing elements better aligned or centered with the center of the sides, i.e., aligned with the edges of the containers' enclosures. Note that some embodiments with rounded sides, whether joined together or molded together at the same time still have edges, although they are not apparent, but are defined by the outermost point of the various sides of the containers. Furthermore, thicker seals provide a tactile area in which to hold the container while minimizing the chance of dropping the container. Thus, the seal is configured as a handle to hold the container in one or more embodiments when the seal is thick enough based on the coefficient of static friction and based on the shape of the seal in order to hold the desired contents securely.

In at least one embodiment of the invention, the first seal portion and the second seal portion include at least one corresponding protrusion or indentation that includes a geometric shape that is wider than another portion of the at least one corresponding protrusion or indentation. The seal may also include gaps meaning that the shapes of ridges and recesses that correspond to one another, i.e., that fit into one another, whether in full contact across the entire boundary or not, may be of different shapes. The path of contact "across" a cross-section of the seal starting from the inside of the container at the first point of contact of the seal to the last point of contact of the seal at the furthest point outside of the container defines boundary of the seal as defined below.

In one or more embodiments of the invention, utilizing the leak resistant seal includes utilizing the protrusion or the indentation having a height of at least 2 mm and utilizing the geometric shape having a width of at least 1 mm thicker than the protrusion or the indentation.

By way of at least one embodiment, utilizing the leak resistant seal includes utilizing the protrusion or the indentation having a height of at least 2 mm and utilizing the geometric shape having a width of at least 2 mm thicker than the protrusion or the indentation.

According to one or more embodiments, utilizing the leak resistant seal includes utilizing two or more of the at least one corresponding protrusion and the at least one corresponding indentation in the leak resistant seal.

At least one embodiment of the invention includes forming the container with a width near the leak resistant seal that is larger than an opposing width of the container away from the leak resistant seal. In one or more embodiments, the leak resistant seal includes a first side and a second side that engage each other. In at least one embodiment, the first side includes a different average thickness than the second side. In one or more embodiments, the first side is made from a different material than the second side. In at least one embodiment, the first side includes a different hardness value than the second side.

By way of one or more embodiments, the leak resistant seal is made from a different material than a remaining portion of the container that does not include the leak resistant seal. In at least one embodiment of the invention, the leak resistant seal includes a different hardness value than the remaining portion of the container that does not include the leak resistant seal.

One or more embodiments of the invention include forming the elastomer into the container with a hardness of between 70 and 80 on a Shore A durometer scale. At least one embodiment of the invention includes forming the elastomer into the container with a hardness of between 40 and 90, or at least less than or equal to 100 on a Shore A durometer scale.

In one or more embodiments of the invention, forming the container includes forming the leak resistant seal at opposing edges of the container that are at least as thick as the leak resistant seal between the opposing edges. By way of at least one embodiment, forming the elastomer into the container includes transfer molding, plastic injection molding, liquid injection molding or compression molding.

One or more embodiments include utilizing an uncured, heat curable elastomer, wherein forming the elastomer into the container includes heat curing the container.

At least one embodiment of the invention includes forming the container in one molding step without attaching any material to the container after the molding. In other embodiments, multiple parts may be formed before bonding them together or before inverting the container. One example would be to separately mold a top enclosure and bottom enclosure, each of which define a portion of the volume that results in the inner portion of the container, then bond them together and then invert the container inside out, i.e., to position the seal on the inside of the container after inverting. In other embodiments, the two portions may be separately formed. This requires an extra step of coupling the parts together, e.g., via bonding, wherein when the top enclosure and bottom enclosure are formed in a mold at the same time, they are coupled together with the same material in one step. A container still has two parts designated as the top enclosure and bottom enclosure that are merely designations of sides of the container in this example. Thus, "coupled to" covers a container made from two separate parts or two parts formed at the same time and coupled within the mold, i.e., during the molding process. Any other features of the container are not critical to the performance of the container, such as pleats for ease of storage and subsequent expansion for larger items held within the container, or colors of the container or specific shapes of the container for example.

In one or more embodiments, coupling the leak resistant seal includes gluing, bonding or attaching the leak resistant seal to the container to couple the leak resistant seal by co-molding the container and the leak resistant seal together or by over-molding the container to the leak resistant seal or by over-molding the leak resistant seal to the container.

At least one embodiment of the invention includes forming the leak resistant seal without bonding or gluing opposing sides of the leak resistant seal at opposing ends of the leak resistant seal, i.e., so that there is a gap between one side of the seal and the other at the ends, wherein when inverted inside out, the two seal portions eliminate the gap to provide a leak resistant seal. One or more embodiments of the invention include forming a bottom on the container such that the container may stand upright.

At least one embodiment of the invention includes forming the container with a thickness of 0.6 mm that increases to 1.8 mm at opposing sides of the leak resistant seal at opposing ends of the container.

One or more embodiments of the invention include forming the container with a thickness of between 0.3 and 0.9 mm that increases to 1.2 to 2.4 mm at opposing sides of the leak resistant seal at opposing ends of the container.

In some embodiments of the invention the top and bottom press-fit elements may extend to portions of the left edge or right edge of the top and bottom enclosures. In such embodiments the opening mechanism for the container may incorporate a seal that is wider at the top of the container or that traverses down the sides of the container or similar design along the sides that allows the container to open wider than if it were to only open on the front edge. Such embodiments may provide considerable convenience by making it easier for a user to insert items into the container or remove items from the container.

One or more embodiments of the invention may provide flaps or tabs extending from the front edge or the sides of the top and bottom press-fit elements. Such flaps or tabs may be used to hold the edges of the container in order to pull it open from its sealed position. These flaps may be of any convenient size or shape and may be placed in any convenient location. In some embodiments for example, the flaps may be shaped roughly as an arc with the widest portion in the center of the front edge. In other embodiments the flaps may consist of simple tabs emerging from the center of the front edge or from other locations. In some embodiments there may be a bottom tab and a top tab, with the bottom tab longer than the top tab. Other embodiments may reverse this arrangement and may have a top tab that is longer than the bottom tab. In other embodiments the flaps or tabs may be of equal size. A longer flap or tab may provide a lever arm for the user when pulling the seal open, allowing the user to more easily open the seal. This feature may be particularly valuable for a very strong seal that is designed for leak resistance, since the user must have a mechanism to overcome the sealing force when opening the container. In one or more embodiments there may be a gap between the top flap and the bottom flap to make it easier for the user to grasp one or both of the flaps for opening.

In one or more embodiments the top or bottom press-fit element may incorporate a vertical protrusion surrounded by two cavities, one forward of the protrusion and one backward from the protrusion. In some embodiments the depths of these two cavities may be unequal. For example, in one or more embodiments a forward cavity may be shallower than a back cavity. A potential advantage of such an asymmetric shape for the press-fit element is that the force required to begin opening the seal from the forward edge may be less than the sealing force towards the back edge. This may facilitate opening by the user while maintaining a strong seal. Once the user has broken the seal at the forward cavity, the additional lever arm provided by the open portion of the press-fit element may be used to continuing opening the back part of the seal.

Embodiments of the invention may incorporate various shapes and sizes for the press-fit elements. In some embodiments the shape of the boundary between the top press-fit element and the bottom press-fit element may contribute significantly to the sealing force. Embodiments may use winding paths for the boundary with multiple changes of direction to improve the seal. Such winding paths provide two potential advantages. First, they can provide resistance to movement of the press-fit elements in multiple directions. Secondly, they can lengthen the distance that liquid must travel to escape from the seal, improving leak resistance. The direction of resistance to movement is quantified by the direction of the normal vector to the boundary surface. In some embodiments a boundary path may provide normal vectors that point in four different directions, including up, down, forward, and backward. Some embodiments may provide more or fewer normal vectors. The normal vectors are orthogonal to the surface whether planar or curved at a particular point along the plane or curve. In some embodiments the normal vectors to the boundary surface may point approximately in these four directions but may point somewhere in all four quadrants of the vertical plane perpendicular to the back-to-front axis of the container. With normal vectors in all quadrants, the press-fit elements provide sealing forces in all directions. In other embodiments the winding path of the boundary may change directions multiple times to provide multiple normal vectors in multiple or all directions on different segments of the boundary path. For example, in one or more embodiments there may be at least three different segments of the boundary path with normal vectors in each of the four directions or four quadrants. Such paths further increase the sealing force.

According to one or more embodiments of the invention, the boundary defines a path of contact between the first seal portion and the second seal portion that is at least 2 times a horizontal distance between a start of the path and an end of the path. In one or more embodiments, the path is at least 2.5 times the horizontal distance between the start of the path and the end of the path, or at least 3 times, or at least 4 times or at least 5 times the horizontal distance between the start of the path and the end of the path. Other metrics for measuring the seal may include measuring the path of the boundary for the seal starting at a point where the seal diverges from the base of the seal, or a flat portion of the seal, along the path of contact between each side of the seal and to a point next to the original starting point back on the flat portion of the seal. This metric for the winding path may yield ratios of at least 4, 5, 6, 7, 8, 9, or greater than 10. In addition, the seal may have gaps within it to enable the seal to open more easily. The gaps may be symmetrical on each side of any protrusion or cavity for example or may be asymmetrical. By including a gap on one side of the protrusion, the seal may be opened more easily from the side having the gap for example.

In one or more embodiments the winding path of the press-fit boundary will be significantly longer than the straight-line back-to-front horizontal distance across the press-fit elements. This longer path improves the sealing by lengthening the path for liquids to travel out of the seal. For example, in some embodiments the length of the boundary path is at least twice as long as the horizontal back-to-front distance between the start and end of the boundary path. Other embodiments may utilize even longer boundary paths with greater distance ratios.

One or more embodiments of the invention incorporate pressure shield elements in front of or otherwise added to inside of the container having the seal. In one or more embodiments, the leak resistant seal located proximal to the outer surface of the container and is separated from the container by a small amount of elastomeric material wherein the pressure shield is located on the inside of the container. The pressure shield elements greatly increase the ability of the seal to remain closed without leaking when subjected to internal pressures that may result from external forces imparted to the outer portion of the container, e.g., when the container is squeezed or dropped. For example, if the elastomeric container is filled with a liquid and is then dropped or moved quickly the motion of the liquid may generate significant internal pressure outward on the walls of the container and the seal depending on the direction of force. Sufficient outward pressure causes the seal to disengage causing a leak, however with the pressure shield, embodiments of the leak resistant seal do not peel open when the force is directed at the pressure shield with a much higher pressure than embodiments that do not employ the pressure shield. The inventors have discovered the surprising result that by adding a small amount of material to the container in the form of a pressure shield in certain geometric proportions, for example approximately 5% in a medium sized container, and in some embodiments, less than 2.5%, that the leak resistance increases by at least 300% in some embodiments and at least 400% in other embodiments, specifically without adding material to the engaging portion of the seal itself, i.e., by not adding material to the male or female portions having ridges and corresponding indentations or cavities. The leak resistant seal male and female portions are the part of the seal that actually holds the seal together when engaged, whereas the pressure shield is not required to have male and female portions or interlocking elements that hold the seal together, yet makes the overall leak resistance of the seal at least 300% more leak resistant, which is very surprising since the pressure shield elements do not directly hold the seal together, i.e., do not lock together with vertically offset ridges and corresponding indentations like the leak resistant seal press-fit elements utilize to lock together.

Pressure that is imparted upon the pressure shield, again which is in inside the container, spreads across a much larger area instead of funneling toward the press-fit elements in prior art seals. Embodiments of the container having the leak resistant seal combined with the pressure shield are at least 300% more leak resistant in some embodiments and at least, 400% more leak resistant in other embodiments to liquids leaking from the internal portion of the inventors container for example with respect to the container described in the '153 Patent having an identical seal portion. This is surprising given the small amount of extra material utilized and which is negligible with respect to the total amount of material utilized in the container. In addition, the pressure shields do not wrap around the seal itself as in prior art devices, which causes cavities where liquid, food and bacteria may become lodged and difficult to remove or otherwise clean. In addition, the pressure shields use far less extra material than prior art devices that have areas where the internal liquids can put pressure against the seal, i.e., wherein the seal is effectively inside the container.

BRIEF DESCRIPTION OF THE DRAWINGS

The above and other aspects, features and advantages of the ideas conveyed through this disclosure will be more apparent from the following more particular description thereof, presented in conjunction with the following drawings wherein:

As shown in FIG. 19A with time increasing from left to right the prior art seal fails when dropped from a height of 4 inches, while embodiments of the seal detailed herein that includes the added pressure resisting elements, does not fail even when dropped from a height of 16 inches as shown in FIG. 19B.

DETAILED DESCRIPTION OF THE INVENTION

A shaped elastomeric container with an integrated leak resistant seal and pressure shield will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

Figure 1:
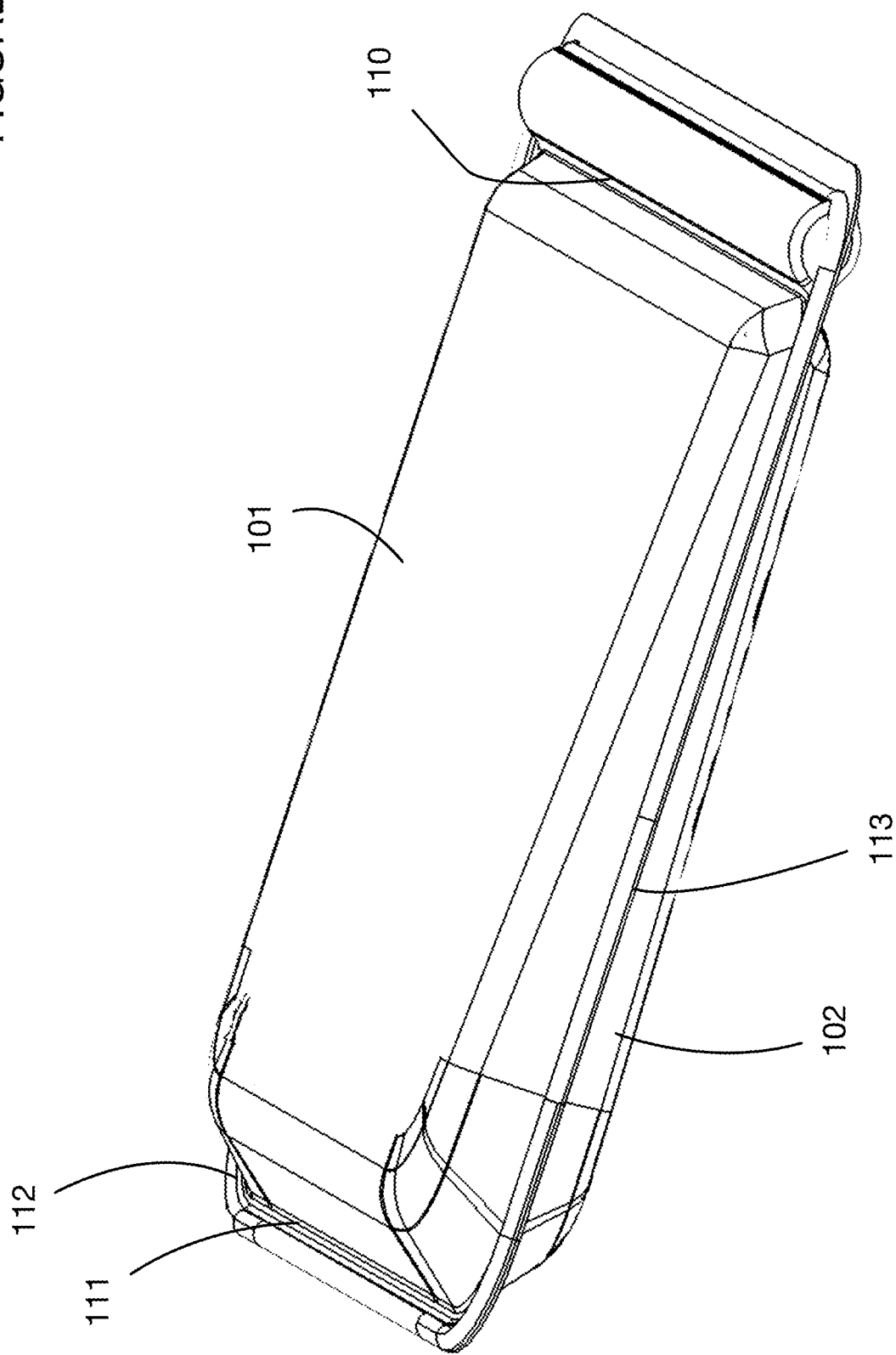
FIG. 1 illustrates a perspective view of an embodiment of the invention with the seal closed.

FIG. 1 illustrates an embodiment of the invention with the container seal closed, shown in a perspective view. In some embodiments the container's materials may include elastomers, such as silicone or other rubbers or polymers. Other materials may be included in various embodiments. In some embodiments, some portions of the container may be rigid; in other embodiments these portions may be flexible. Embodiments that incorporate silicone offer a benefit of heat-resistance; thus, for example such embodiments may be placed in an oven to heat food contained in the container. Some embodiments may be configured to be reused; other embodiments may be configured for single uses. One or more embodiments of the invention include forming the elastomer into container 100 (and all other embodiments detailed herein besides the embodiment of FIG. 1) with a hardness of between 70 and 80 on a Shore A durometer scale. At least one embodiment of the invention includes forming the elastomer into the container with a hardness of between 40 and 90 on a Shore A durometer scale, or in any case less than 100 Shore A.

Figure 12:
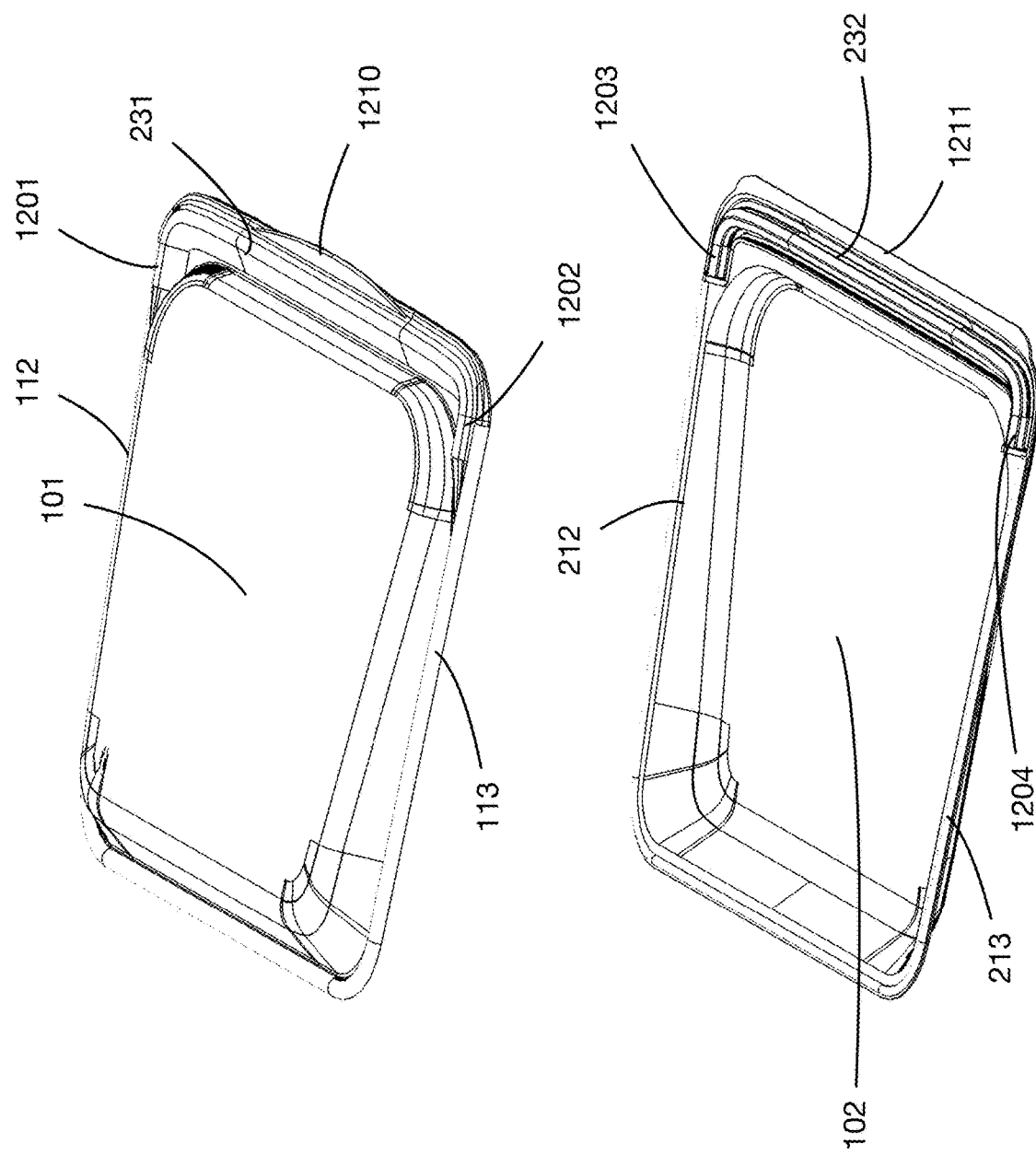
FIG. 12 illustrates an embodiment of the invention in exploded view when formed from one component, or for example before attachment of at least a portion of the top and bottom element, with the seal's press-fit elements extending from the front edges to portions of the left and right edges of the enclosures. This embodiment also illustrates a top flap and a bottom flap extending forward from the seal.
Figure 14:
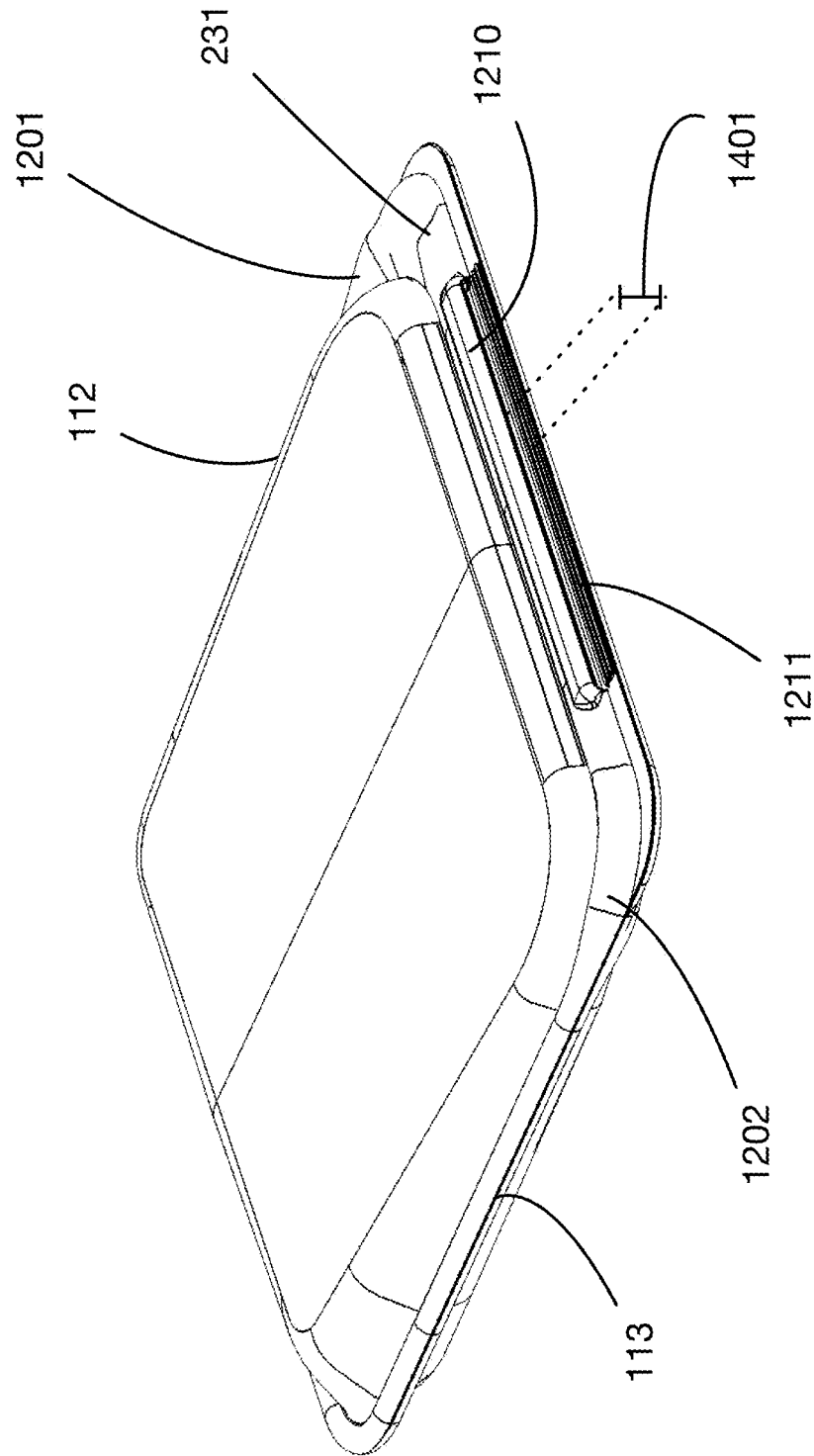
FIG. 14 illustrates another embodiment of the invention with the seal's press-fit elements extending from the front edges to portions of the left and right edges of the enclosures, and with top and bottom flaps configured with a vertical gap between them to facilitate grasping the flaps.

FIG. 1 shows an embodiment of a container with top enclosure 101 and bottom enclosure 102. Top enclosure 101 has front edge 110, back edge 111, left edge 112 and right edge 113. In the embodiment shown the top enclosure and the bottom enclosure are contiguous when formed from one element or joined via a seam along the back, left, and right edges for embodiments that utilize a plurality of components to form the apparatus. The front edges are not joined permanently but are in contact when closed and are held closed via the sealing elements that extend forward from the front edges. Top and bottom enclosures may be formed or joined using integrated molding of both enclosures or may be joined via various other methods to join elastomeric elements together. In some embodiments it is desirable that the joints between the top and bottom enclosures be continuous without gaps, so that the container can hold liquids without leaking. Furthermore, thicker seals such as seal 110 provide a tactile area in which to hold the container while minimizing the chance of dropping the container. Thus seal 110 is configured as a handle to hold the container in one or more embodiments, for example from the top, (right side as shown in FIGS. 1, 12 and 14) when the seal is thick enough based on the coefficient of static friction of the material utilized to construct at least the seal portion of the container and based on the shape of the seal in order to hold the desired contents securely.

Figure 2:
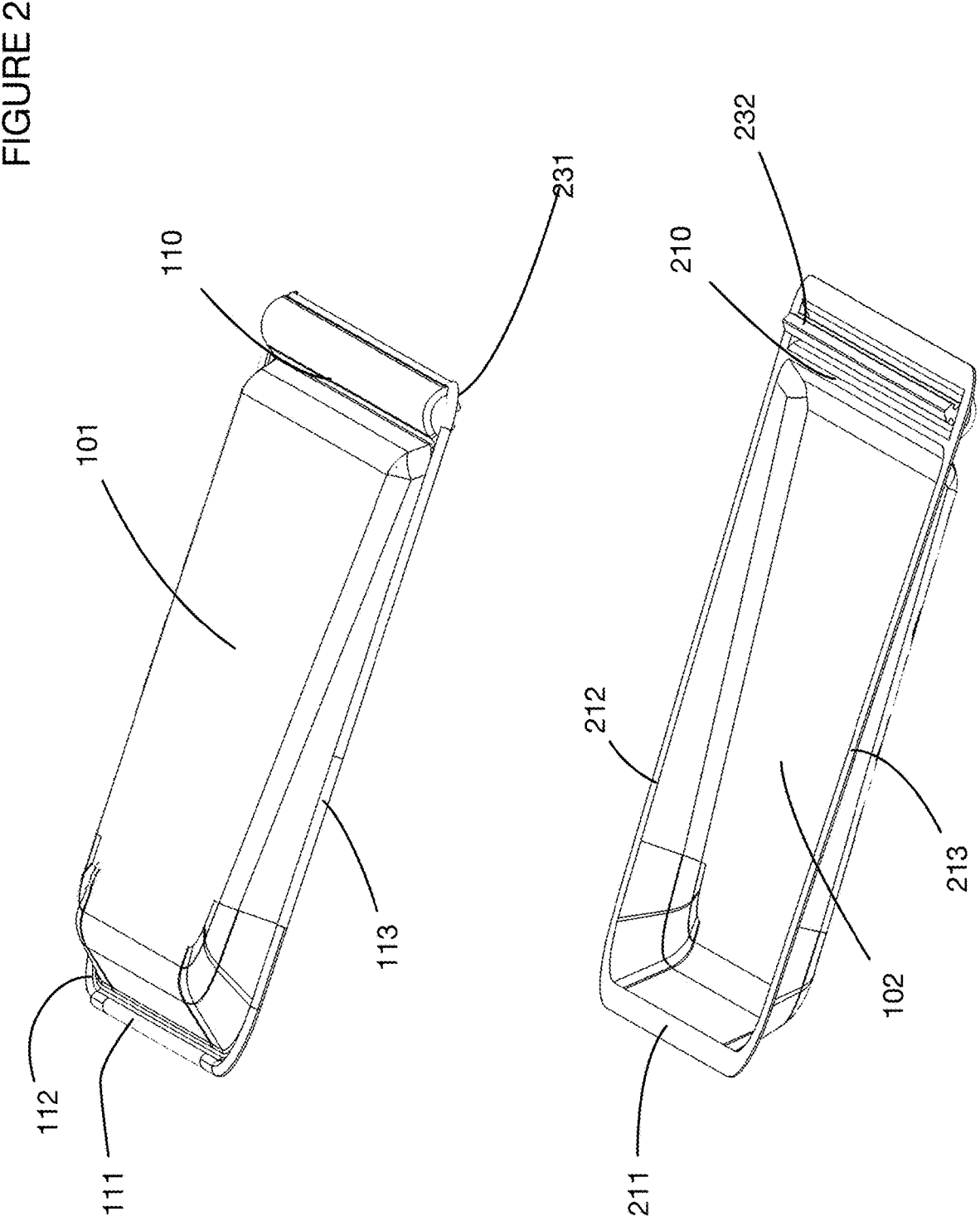
FIG. 2 illustrates the top and bottom enclosures and top and bottom press-fit elements of the embodiment shown in FIG. 1, for example in exploded view, when formed from one component or before attachment of portions of the top and bottom portions to one another.

FIG. 2 shows an exploded view of FIG. 1 with the top enclosure 101 and the bottom enclosure 102 shown separately. Thus, the container shown may be formed from two separate parts or formed in one molding step where both parts are effectively formed at the same time. This figure does not imply that the container is or in any way required to be constructed from two separate parts that are constructed before coupling to one another. Rather, this is simply an exploded view showing the two portions or parts of the container whether formed at the same time and coupled to one another or coupled together later. Thus, embodiments of the invention that are described having two parts are universal in meaning either two separate parts that are then attached or two parts that are formed to together to make container 100. As in FIG. 1, top enclosure 101 has edges 110, 111, 112, and 113. Extending forward from front edge 110 of top enclosure 101 is top press-fit element 231. In FIG. 2 the edges of bottom enclosure 102 are also visible: front edge 210, back edge 211, left edge 212, and right edge 213. In the embodiment shown, the edges 210, 211, 212, and 213 of the bottom enclosure are in contact with edges 110, 111, 112, and 113 respectively of the top enclosure when the container is closed. In other embodiments edges of the top enclosure and bottom enclosure may not be fully in contact even when the container is closed, to enable flaps for opening or other structures with holes or attachment elements as one skilled in the art will recognize. Attached to the front edge of bottom enclosure 102 is bottom press-fit element 232. In the embodiment shown, the press-fit elements extend forward from the front edges of the enclosure halves. In other embodiments these press-fit elements may be oriented differently; for example, in some embodiments they may extend backwards from the front edges of the top and bottom enclosures, i.e., wrap down or otherwise be integrated with at least a portion of the sides. The specific location of the press-fit elements may be varied as long as they are able to mate together to seal the container. In some embodiments the press-fit elements may extend from the front edge to portions of the left or right edges of the top and bottom enclosures. Again, top and bottom enclosures may be coupled to one another during a molding process or separately and as FIG. 2 is an exploded view, it is not intended to indicate that the two parts of a single container are required to be separately formed and then later attached to one another.

In the embodiment shown in FIG. 2, the top enclosure 101 and bottom enclosure 102 have curved shapes so that when they are joined together there is an inner volume enclosed by the container. In some embodiments the materials and shape of the enclosures may be sufficiently rigid that this volume is present even when the container is empty. In other embodiments the materials and shape may be more flexible, such that the top and bottom enclosures collapse against one another, as in a thin plastic bag, when the container is empty. Embodiments of the invention may also be formed inside out as taught in Applicant's U.S. Patent Ser. No. 10,407,217, issued 10 Sep. 2019 or its child Continuation in Part, namely U.S. Utility patent application Ser. No. 16/566,799 filed 10 Sep. 2019, the specifications of which are hereby incorporated herein by reference and which may be utilized to construct or otherwise form any or all of the embodiments detailed herein.

Figure 3:
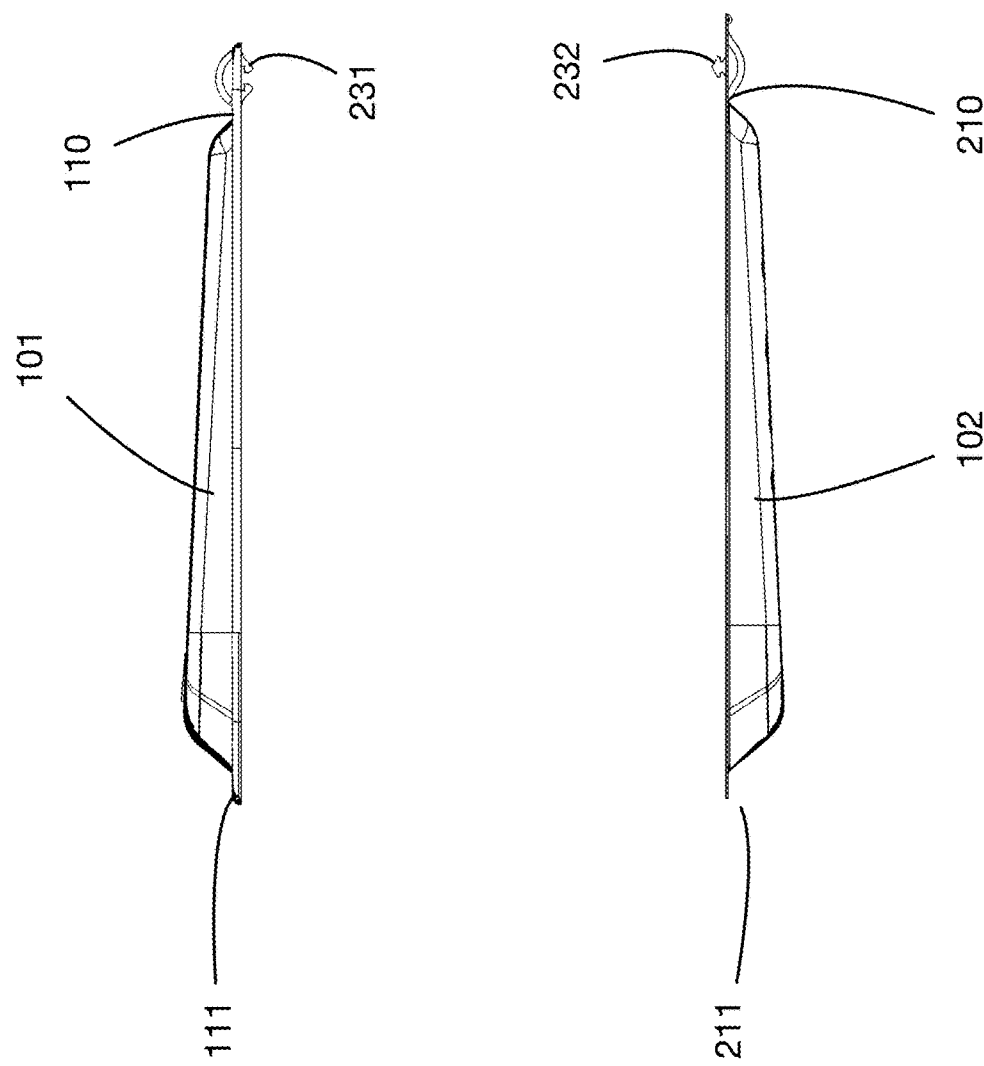
FIG. 3 shows a side view of the top and bottom enclosures and top and bottom press-fit elements of FIG. 2.

FIG. 3 shows a side view of the embodiment shown in FIGS. 1 and 2, again, in exploded format whether formed separately and attached for formed at substantially the same time in a single molding step, with the top enclosure 101 and bottom enclosure 102 shown separately. This side view shows more clearly that the top press-fit element 231 and the bottom press-fit element 232 are shaped and oriented to fit together to provide a seal for the container. In this embodiment bottom press-fit element 232 has a protrusion with a triangular top that extends upward and that fits into a corresponding recess in top press-fit element 231. Other embodiments may employ different shapes for the top and bottom press-fit elements.

Figure 4:
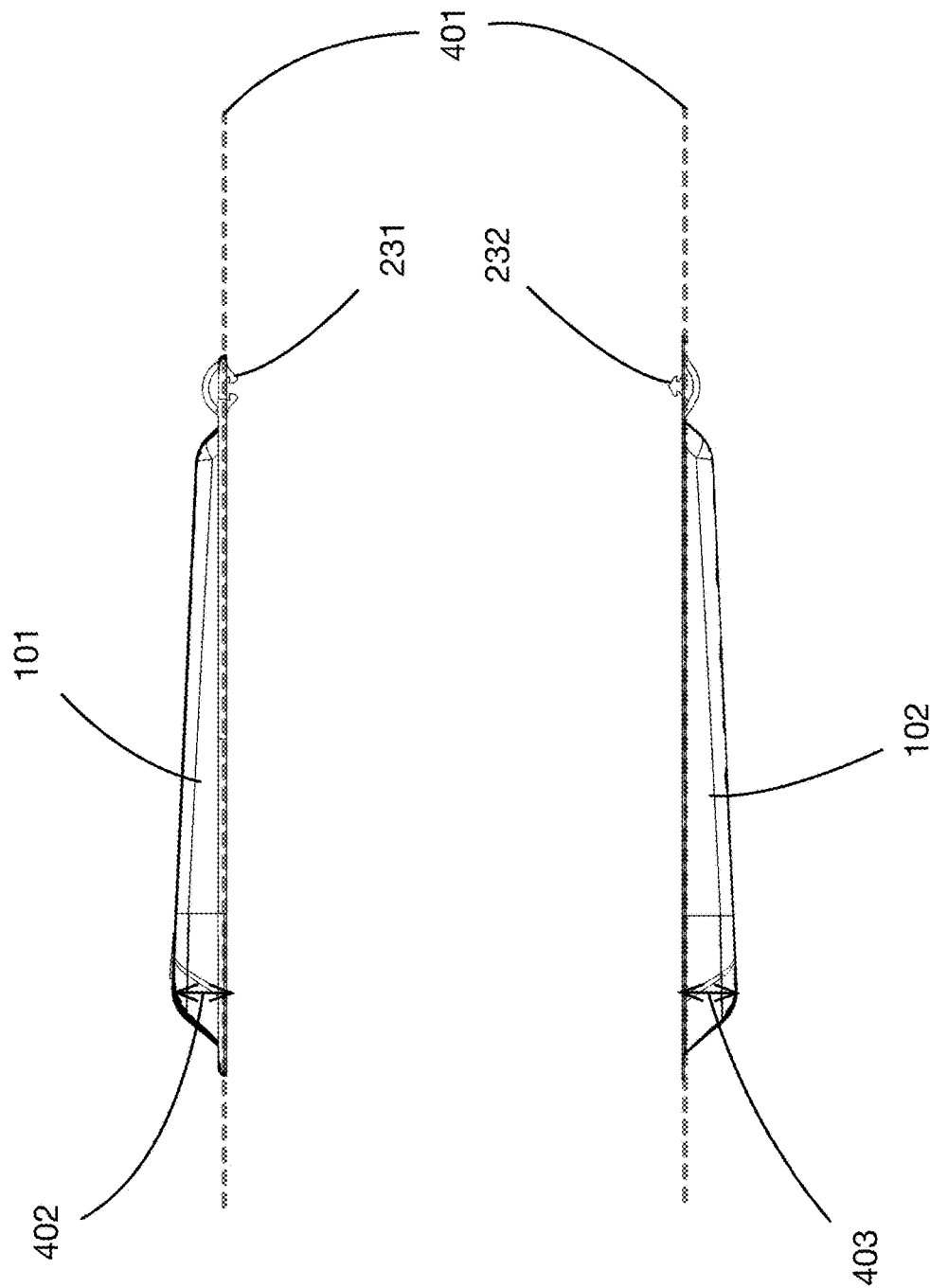
FIG. 4 shows a side view of the enclosures and press-fit elements from FIG. 3 relative to the center horizontal plane.

FIG. 4 shows an annotated view of FIG. 3. Center horizontal plane 401, running in this embodiment along the front-to-back axis, is the plane along which top enclosure 101 and bottom enclosure 102 are joined. In this embodiment the edges of the top enclosure 101 are located on the plane 401, as are the edges of the bottom enclosure 102. In other embodiments different shapes may be used so that edges need not all lie on a common plane. Portions of the top press-fit element 231 extend below plane 401 in this embodiment, and portions of the bottom press-fit element 232 extend above plane 401 in this embodiment. In other embodiments one or more of the press-fit elements may lie entirely on one side of the center horizontal plane. FIG. 4 also shows that top enclosure 101 has a height 402 of its enclosed volume above the horizontal plane 401, and that bottom enclosure 102 has a height 403 of its enclosed volume below the horizontal plane 401. In this embodiment the top enclosure and the bottom enclosure are approximately mirror images of one another across the center horizontal plane. Other embodiments may employ other shapes, including shapes that are not mirror images or that do not have flat edges on a common horizontal plane. Different embodiments may provide various sizes and shapes for the volume enclosed by the container when it is closed.

Figure 5:
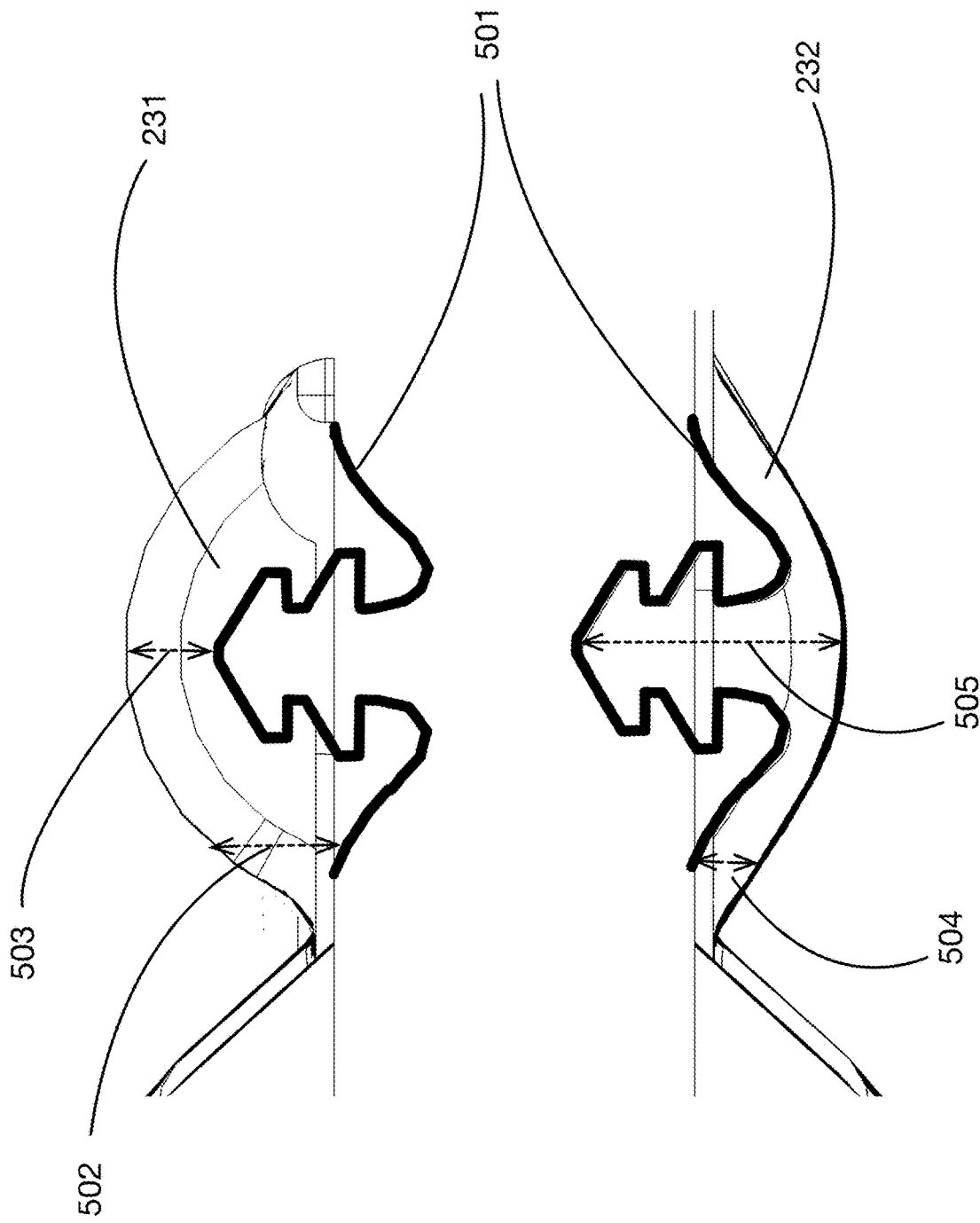
FIG. 5 illustrates a side view of the top and bottom press-fit elements of an embodiment of the invention, with their common boundary for example as shown with bold lines.

FIG. 5 shows a close-up of a side view, i.e., cross-section view of the top press-fit element 231 and bottom press-fit element 232 of the embodiment shown in FIG. 4. When closed and sealed, the press-fit elements meet at a common boundary 501. In the embodiment shown, the bottom press-fit element has a center vertical protrusion with a groove on either side of the protrusion. The top press-fit element has a corresponding recess to accept the protrusion, and has protrusions extending downward to fit into the grooves of the bottom press-fit element. The thickness of the material of the press-fit elements is a significant factor contributing to the strength of the seal. In the embodiment shown in FIG. 5, the thickness varies across the press-fit elements. For example, near the back edge of the press-fit elements, bottom press-fit element has thickness 504 and top press-fit element has thickness 502. In the center of the bottom protrusion, bottom press-fit element has thickness 505 and top press-fit element has thickness 503. In one or more embodiments, the average material thickness of the top and bottom press-fit elements is at least 0.25 cm, in other embodiments, any value up to 0.5 cm, in other embodiments any value between 0.5 cm and 0.75 cm and in other embodiments 1.0 cm across their common boundary 501. Material thickness at or in excess of these ranges can contribute to forming a leak-resistant seal when the enclosure is closed and sealed. For example, in one embodiment with average thickness of press-fit elements of about 0.8 cm, experiments have demonstrated a seal sufficient to contain 1 to 2 cups of water without leakage even when the container is held upside down (with the front facing downward) so that the water exerts pressure against the seal.

Figure 6:
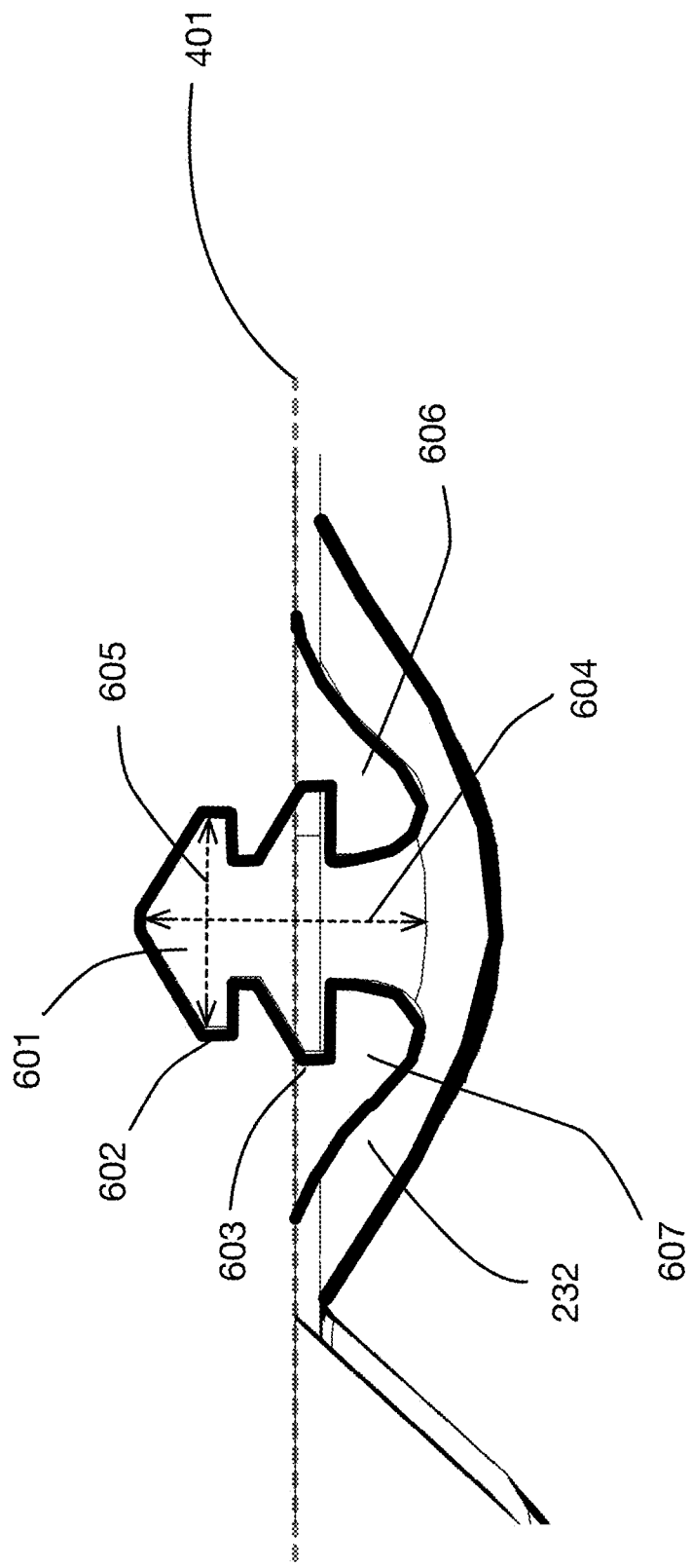
FIG. 6 illustrates detailed features of the lower press-fit element of an embodiment of the invention.

In some embodiments, the shapes and dimensions of the press-fit elements may also contribute significantly to the leak resistance of the seal. FIG. 6 illustrates details of the bottom-press fit element 232 of the embodiment shown in FIG. 5. In this embodiment, vertical protrusion 601 extends upward from the bottom press-fit element, while cavities 606 and 607 are on either side of this vertical protrusion. Other embodiments may have different numbers and shapes of protrusions and cavities, configured as male elements and female elements that fit together when the seal of the container is closed. In some embodiments a main vertical protrusion, like protrusion 601, may be located on the top press-fit element, rather than on the bottom press-fit element as in FIG. 6. As shown, the vertical protrusion is symmetrical, however, any asymmetrical shape may also be utilized so long as the seal is shaped for the desired leak resistance of the given implementation. In addition, by constructing embodiments of the leak resistant seal using an elastomer, geometries such as shown are able to engage ridges that stretch and then extend into corresponding indentations that are an order of magnitude wider than typical plastic ridges in known plastic bags. These ridges would not work with more rigid plastic in the Shore D range that is utilized in such bags.

In the embodiment shown in FIG. 6, vertical protrusion 601 has two horizontal ridges 602 and 603 extending horizontally outward from the vertical protrusion. These ridges have triangular sloped upper surfaces to facilitate insertion into the corresponding cavities in the upper press-fit element. They also have flat horizontal lower surfaces that provide resistance to opening once the protrusion is inserted into the upper cavities. Other embodiments may have vertical protrusions with only one horizontal ridge, or with more than two horizontal ridges. In some embodiments vertical protrusions may have no horizontal ridges and other features of the shape or material of the press-fit elements may provide sufficient sealing force.

In the embodiment shown in FIG. 6, vertical protrusion 601 extends above the center horizontal plane 401, and cavities 606 and 607 extend below the center horizontal plane 401. This arrangement of the components of the press-fit element has the effect of centering the sealing elements relative to the top and bottom enclosures. Such a design may have a significant benefit for embodiments with relatively thick material in the press-fit elements, since otherwise the seal would potentially extend far above or below the outer surfaces of the top or bottom enclosures. For comparison, very thin plastic bags may have sealing elements that include a protrusion extending entirely above one side of the bag, with no corresponding cavities below that side of the bag. Such a design may be acceptable with very thin sealing elements, but such seals may not be as leak resistant as seals with thicker material.

The vertical protrusion 601 in FIG. 6 has vertical height 604 above the cavities 606 and 607, and the horizontal ridge 602 has width (measured back to front) of 605. In one or more embodiments of the invention, one or more vertical protrusions have height 604 of at least 0.2 cm, e.g., 80%, or any other percentage of the overall thickness of the upper and lower press-fit elements, in other embodiments, any value between 0.4 cm and 0.6 and in other embodiments 0.8 cm. In other embodiments, one or more horizontal ridges extending from a vertical protrusion have width 605 of at least 0.1 cm wide or any other width, including any value greater than 0.1 cm, such as 0.2 cm or wider. Dimensions such as these exemplary values may contribute to a higher sealing force that causes the container to be leak resistant. Some embodiments may have a plurality of vertical protrusions or a plurality of horizontal ridges that provide sufficient aggregate sealing force even though individual vertical protrusions and horizontal ridges are below these exemplary dimensions. In one or more embodiments, the width of the seal may be varied to provide a higher or lower leak resistance capability.

Figure 7:
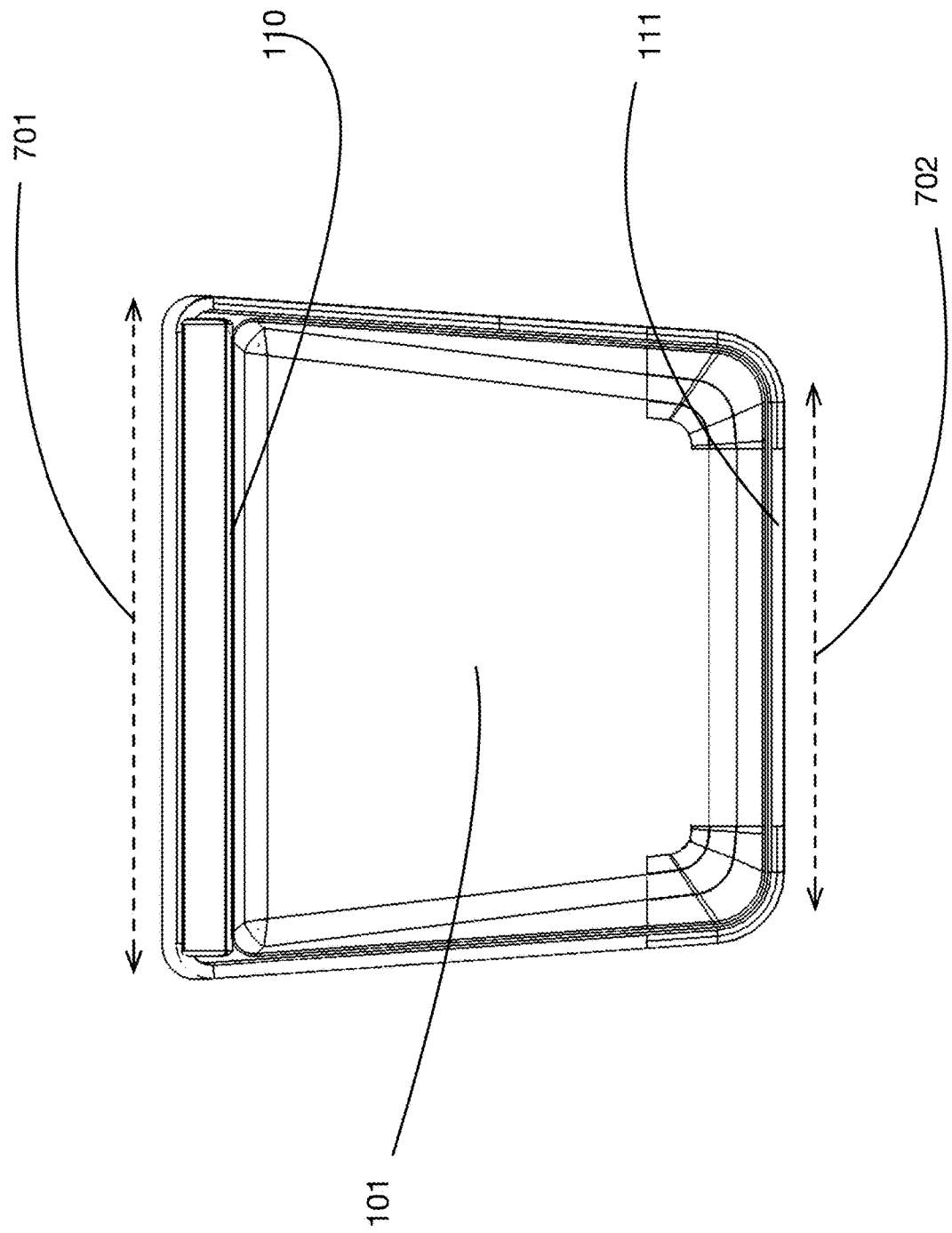
FIG. 7 illustrates a top view of an embodiment of the invention in which the front edge is longer than the back edge.

FIG. 7 illustrates at top-view of an embodiment of the invention with top enclosure 101 shown. In this embodiment the length 701 of front edge 110 is larger than the length 702 of back edge 111. The edges of top enclosure 101 therefore form roughly a trapezoid, rather than a rectangle. Such an embodiment offers the potential advantage that it is easier to place items into the opening of the container, or remove them from the container, because the opening along the front edge 110 is larger. Such a design may be particularly beneficial when the sealing elements are larger and thicker, since larger and thicker sealing elements may tend to pinch together at the left and right edges.

Figure 8:
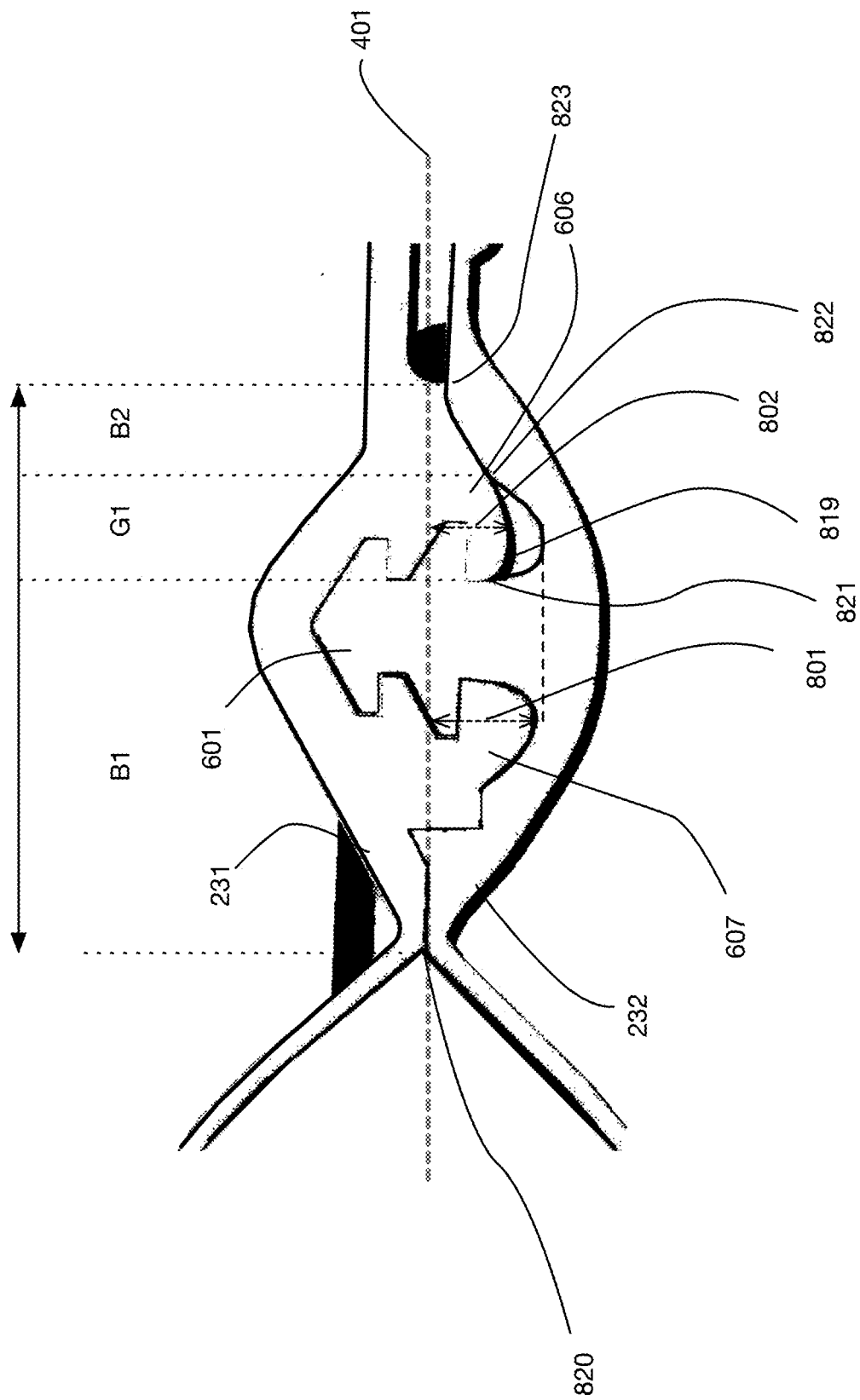
FIG. 8 illustrates the top and bottom press-fit elements of an embodiment of the invention in which a front vertical cavity is shallower than a back vertical cavity.

FIG. 8 illustrates a close-up side view of the top and bottom press-fit elements of another embodiment of the invention. In this embodiment bottom press-fit element 232 has a vertical protrusion 601 and cavities 606 and 607 on either side of the vertical protrusion. This basic structure is similar to that of the embodiment shown in FIG. 6. However, in the embodiment of FIG. 8, the vertical cavity 607 towards the back has depth 801 below center horizontal plane 401 that is greater than the depth 802 of the vertical cavity 606 towards the front. This asymmetry offers the potential advantage of reducing the amount of force needed to begin opening the seal from the front, while maintaining a deeper cavity towards the back to resist pressure from inside the container pressing against the seal. It therefore contributes to the leak resistance of the seal while mitigating the effect of this leak resistance on the force required by a user to open the container. Other embodiments may provide other asymmetric shapes with different arrangements and dimensions of cavities and protrusions to accomplish the same objective of a strong seal with a mitigated opening force.

One or more embodiments of the invention provide leak resistance in part by utilizing a winding path for the boundary between the top press-fit element and the bottom press-fit element. When the seal is closed, liquids flowing through gaps in the seal must traverse this entire winding path. FIG. 8 shows such a gap, i.e., at gap 819 having horizontal width G1 between first boundary of contact having horizontal width B1, starting at contact point 820 when traversing the seal from left to right up to contact point 821 (where the gap begins) and second boundary of contact having horizontal width B2, starting at contact point 822 (where the gap ends) when traversing the seal from left to right up to contact point 823. Hence a longer and more tortuous path increases the leak resistance of the seal. Different embodiments may employ various shapes for such a winding path.

Embodiments of the invention provide opposing surfaces of the top press-fit element and the bottom press-fit element to resist forces in multiple directions. These opposing surfaces in multiple directions contribute to the strength of the seal and the resistance of the seal to leaks. In one or more embodiments, opposing forces between the top and bottom press-fit elements exist in multiple directions, or for example each of the four directions up, down, forward and backward (when viewed from a side view). In some embodiments the directions of opposing forces exist in all four quadrants of the plane perpendicular to the front edge but may not be precisely along the vertical and horizontal axes. Such embodiments effectively provide opposing forces in all four directions since the vector sum of the actual forces includes components in the positive and negative vertical and horizontal directions.

In one or more embodiments, multiple segments of the common boundary provide resistance to forces in each direction. With multiple segments providing force resistance in various directions, the strength of the seal may be further increased.

Figure 9:
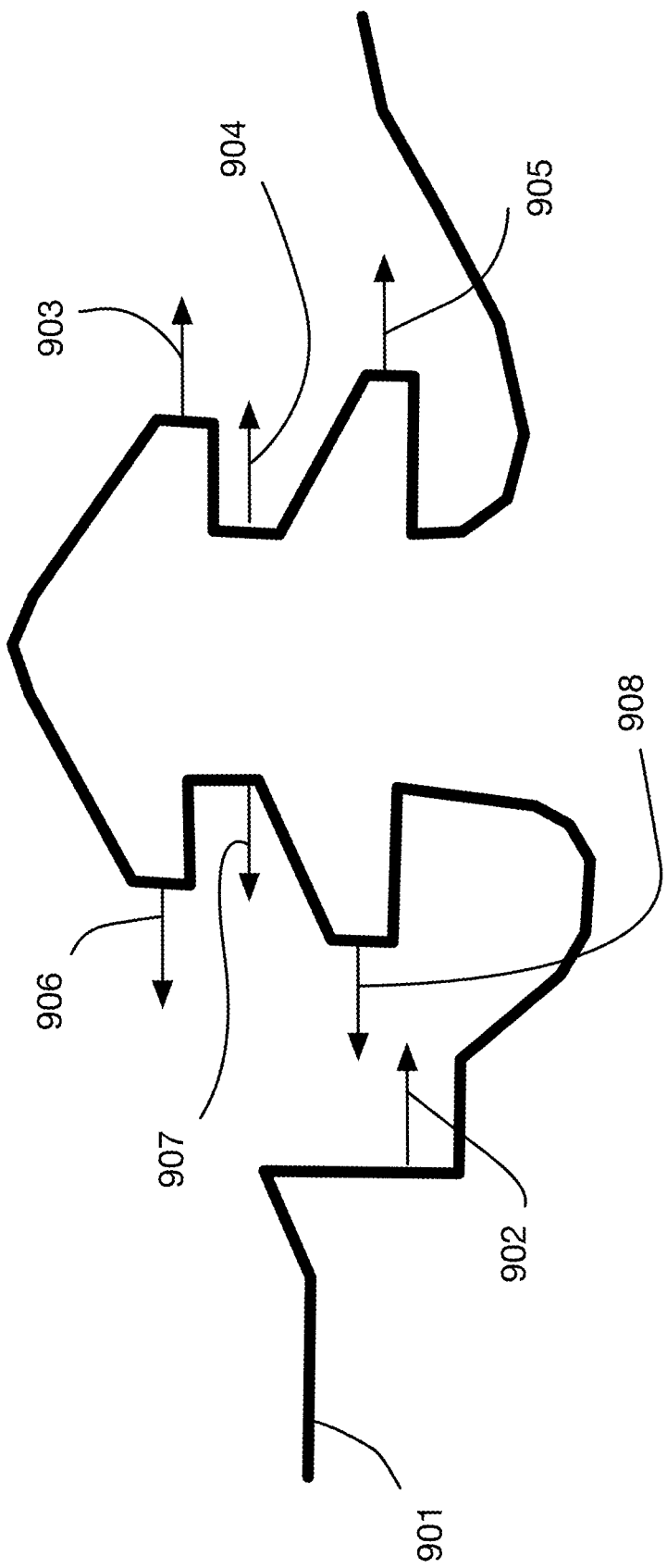
FIG. 9 illustrates the press-fit boundary of the embodiment of the invention shown in FIG. 8, along with horizontal normal vectors to the boundary.

The directions of the opposing forces between the top press-fit element and the bottom press-fit element are represented by the normal vectors to the common press-fit boundary between the top and bottom press-fit elements. FIG. 9 illustrates this boundary 901 for the embodiment of the invention shown in FIG. 8. In FIG. 9 several horizontal normal vectors are shown for this boundary. Normal vectors 902, 903, 904, and 905 are horizontal towards the front. Normal vectors 906, 907, and 908 are horizontal towards the back. In this embodiment, there are at least 4 normal vectors in the horizontal front direction, each on a different segment of the boundary, and there are at least 3 normal vectors in the horizontal back direction, each on a different segment of the boundary.

Figure 10:
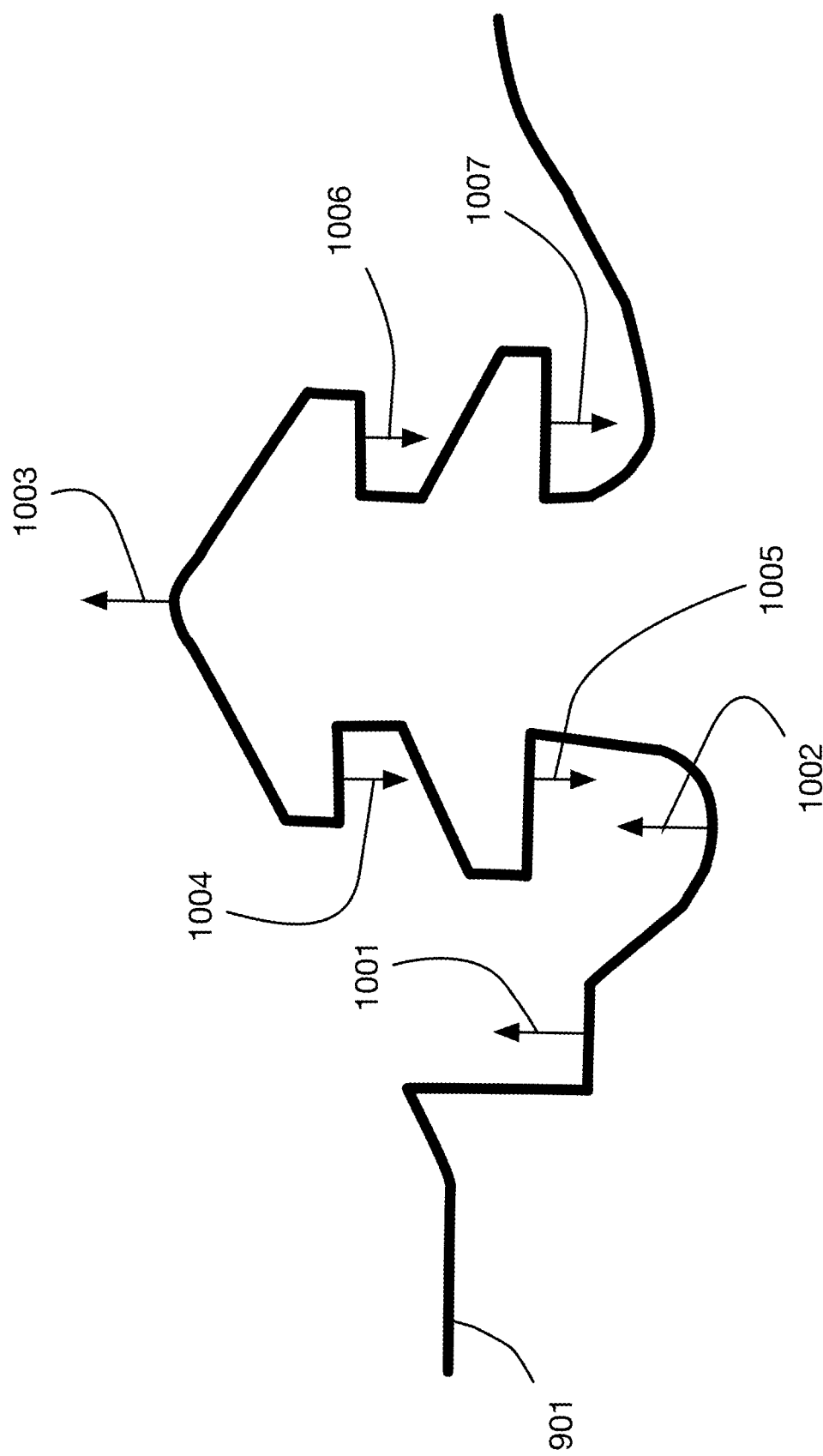
FIG. 10 illustrates the press-fit boundary of the embodiment of the invention shown in FIG. 8, along with the vertical normal vectors to the boundary.

FIG. 10 illustrates vertical normal vectors for the embodiment shown in FIG. 9. In this embodiment, normal vectors 1001, 1002, and 1003 are vertical pointing upwards, and normal vectors 1004, 1005, 1006, and 1007 are vertical pointing downwards. Thus, in this embodiment there are at least 3 normal vectors in the vertical up direction, each on a different segment of the boundary, and there are at least 4 normal vectors in the vertical down direction, each on a different segment of the boundary.

FIGS. 9 and 10 illustrate an exemplary embodiment of the invention with at least 3 different segments of the boundary having normal vectors in each of the directions forward, backward, up, and down. The embodiment shown has a winding boundary that changes direction multiple times to provide the forces in each direction. Other embodiments of the invention provide only a single segment for the normal vector in each of the four directions, again that are not required to be aligned with an axis, but rather which exist in four quadrants of the plane perpendicular to the front edge whether or not aligned precisely along the vertical and horizontal axes, or may provide more than 3 segments for the normal vector in each of the four directions. In some embodiments, there may be more segments providing normal vectors to forces in horizontal directions to increase the seal's resistance to horizontal pressure. Different embodiments of the invention may employ boundary path shapes optimized for the forces expected for the application of the container for this embodiment. In various embodiments the segments of the boundary may be flat, pointed, curved, segmented, or any combination thereof as appropriate for the application.

Figure 11:
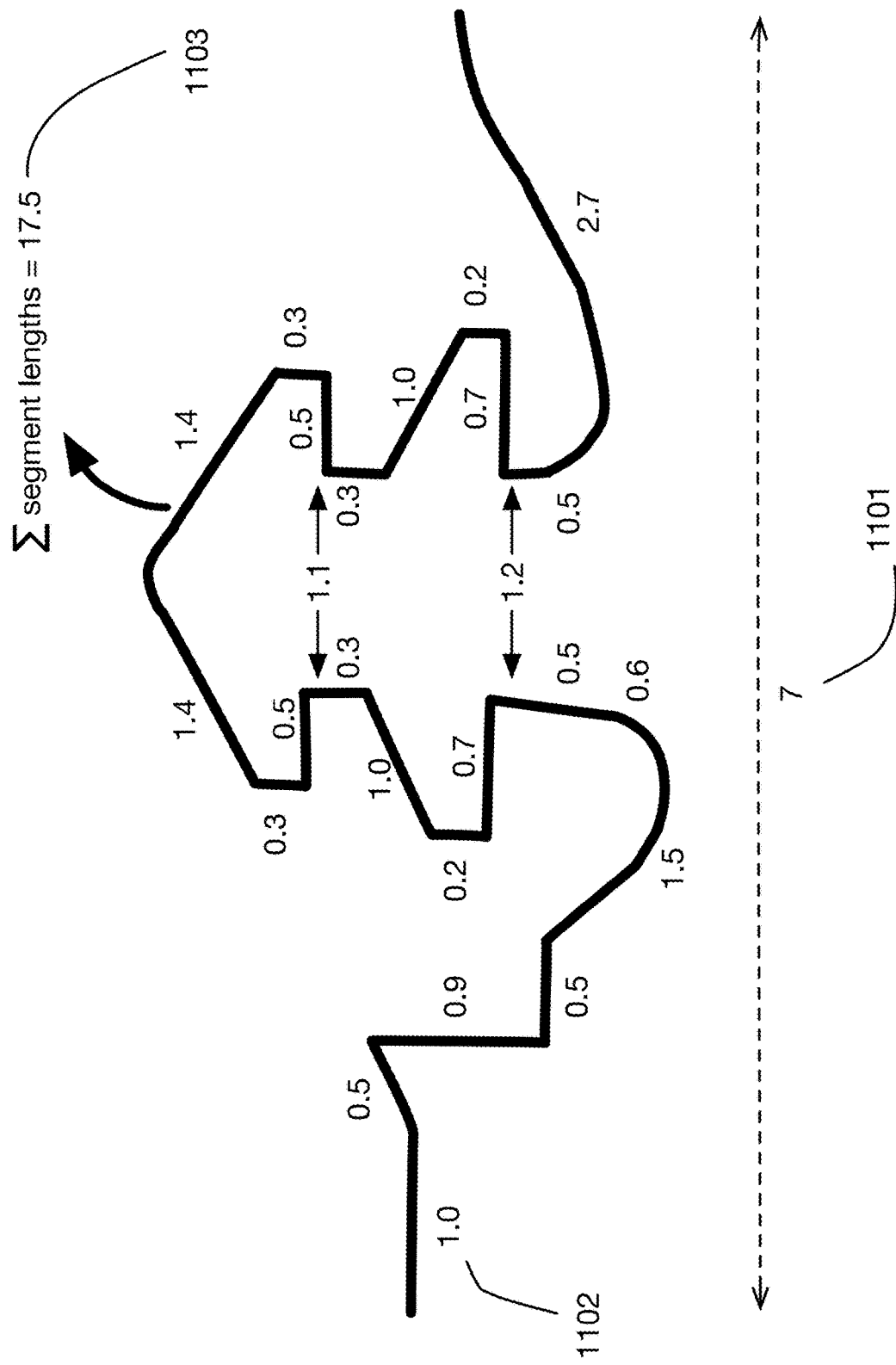
FIG. 11 illustrates the press-fit boundary of the embodiment of the invention shown in FIG. 8, along with the path length of the boundary.
Figure 16A:
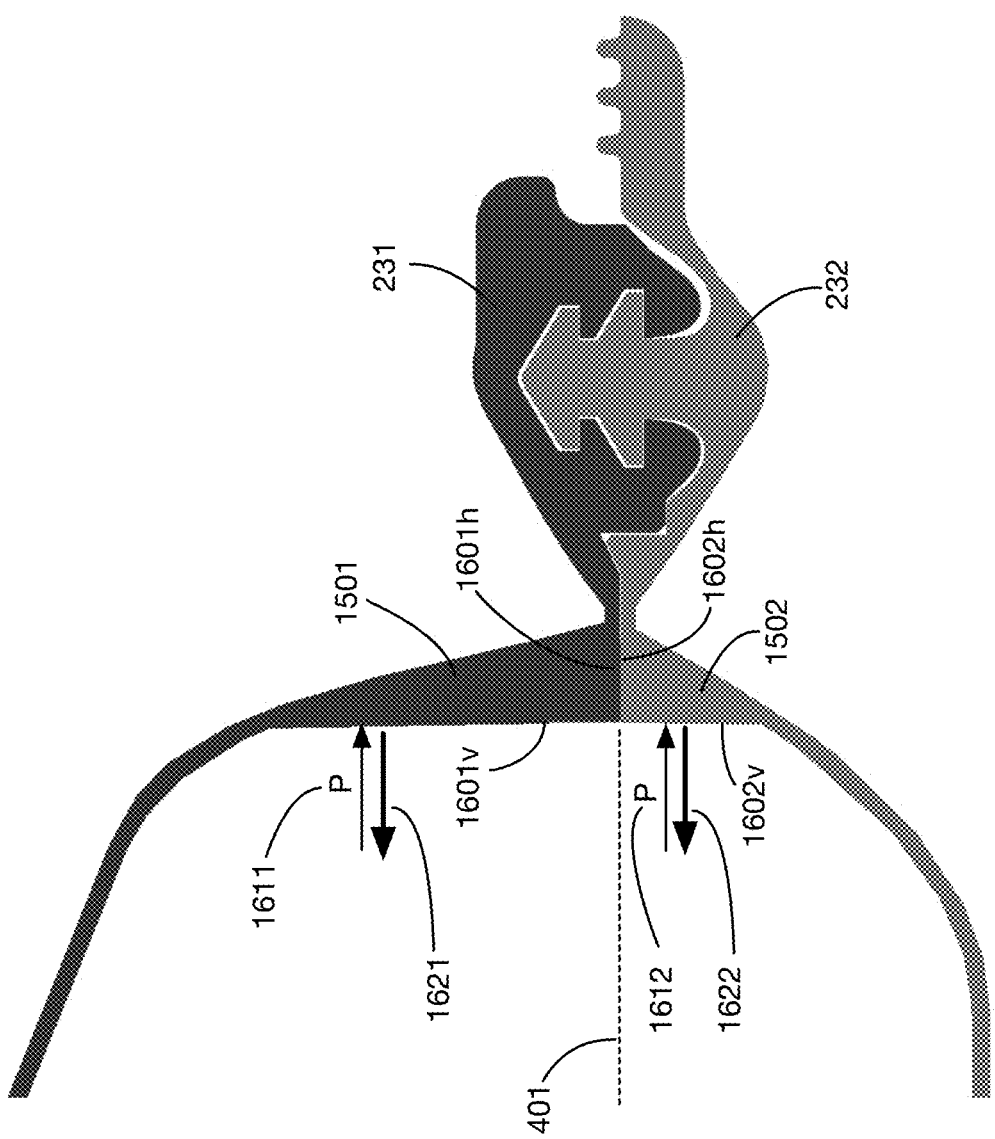
FIG. 16A shows a view of the top and bottom sealing and pressure resisting elements of the seal of FIG. 15C.

FIG. 11 shows an exemplary embodiment of the winding path of the seal with a leftmost horizontal length of the portion of the seal that is in contact with the corresponding portion on the other half of the seal. In this case, the length is 1.0. (The lengths shown are only relative to one another; they are not expressed in any specific units.) In the embodiment shown, the total length 1103 of the winding boundary path is 17.5. The horizontal distance 1101 between the start and end of the path is 7.0. Thus, the path length is approximately 2.5 times the horizontal distance. Embodiments of the invention that employ a pressure shield add length to the width of the boundary and generally increase the denominator as shown with respect to FIGS. 16A-E, described in detail below. In FIG. 16A, the width of the pressure shield at 1601$h$ is approximately 1.0 and hence, the calculations above are 17.5/(7.0+1.0)=2.2. This ratio of path length to horizontal distance is a quantification of the extent to which the boundary path winds and changes directions, which contributes to the sealing force and the leak resistance. Some embodiments of the invention, have a boundary path length of at least twice the horizontal distance between the start and end of the path, for example if the horizontal portion of the contact area is larger or if the ridges on the seal are shorter, etc. For example, other embodiments may have a path length that is at least 3 times, or at least 4 times or at least 5 times the horizontal distance between the start of the path and the end of the path. Other metrics for measuring the seal may include measuring the path of the boundary for the seal starting at a point where the seal diverges from the base of the seal, or a flat portion of the seal, along the path of contact between each side of the seal and to a point next to the original starting point back on the flat portion of the seal. This metric for the winding path may yield ratios of at least 4, 5, 6, 7, 8, 9, or greater than 10. As shown if using only one protrusion as a male portion of the leak resistant seal, e.g., if the seal only is implemented with the upper portion of the "Christmas tree" shape as the male component, then the ratio is calculated as A=(0.3+0.5+0.3+1.4)*2 (for both sides since symmetrical)=5.0, divided by the width of the base=1.1 yields a ratio of 4.5. If calculating this metric using both levels of ridges, i.e., with the seal as shown, but with any type of side portion of the seal, or no side portion at all, then the ratio is calculated as above but with the lower portion to add, namely B=(0.5+0.7+0.2+1.0)*2 (since approximately symmetrical)=4.8. Hence, A+B, i.e., the total length of the full "Christmas tree" embodiment of the seal equals 9.8. The width of the lower portion of the seal that acts as the base portion for purposes of the calculation is 1.2 as shown, which results in a ratio of approximately 8. The longer the path, for a given base, the higher the ratio and generally the more leak resistant the seal is. For embodiments of the invention that employ a pressure shield, these calculations do not change since they do not include metrics to the side of the engaging portion of the seal. This geometry is simply not possible to engage and disengage if using materials such as plastic with rigidity measured on the Shore D scale, wherein elastomers with rigidity measure in the mid-range of the Shore A scale are able to stretch on engagement and deploy the ridges into the corresponding cavities on the opposing portion of the seal. Specifically, embodiments may be constructed using an elastomer with a hardness of between 70 and 80 on a Shore A durometer scale. At least one embodiment of the invention includes forming the elastomer into the container and seal with a hardness of between 40 and 90 on a Shore A durometer scale.

Some embodiments of the invention utilize multiple techniques to enhance the leak resistance of the seal. For example, the embodiment shown in FIG. 8 provides a winding boundary path of length more than twice the horizontal distance, as well as three or more normal vectors in each of the four directions up, down, backward, and forward. In some embodiments such techniques may be combined with a high average material thickness or other dimensional or material variations for the press-fit elements to further increase the leak resistance.

In one or more embodiments of the invention, the press-fit elements of the seal may extend to portions of the left edge or the right edge, or both, of the top and bottom enclosures. FIG. 12 illustrates an embodiment in which the press-fit elements are located along the front edges and also along the front portions of the left and right edges. FIG. 12 shows an exploded view of the top enclosure 101 and bottom enclosure 102. In this embodiment top press-fit element 231 has portion 1201 that is proximal to left side 112, and portion 1202 that is proximal to right side 113. Similarly, bottom press-fit element 232 has portion 1203 that is proximal to left side 212 and portion 1204 that is proximal to right side 213. In the embodiment shown, the press-fit elements curve around the corners between the front edge and the left and right edges. In other embodiments the press-fit elements may form right angles at the corners or may form any curved or polygonal shape to extend from the front edge to the left and right edges. Embodiments may employ curved shapes for the corners that may be circular, oval, elliptical, or any other shape. Embodiments may employ polygon shapes for the corners that may be rectangular, or they may use multiple segments with any angles between the segments. In some embodiments the press-fit elements may extend to only one of the left or right edges. A potential advantage of embodiments in which the press-fit elements extend to the left and right edges is that the opening of the container may be wider, simplifying insertion or removal of objects.

In one or more embodiments of the invention, the container may include a top flap or a bottom flap, or both, proximal to the opening. These flaps may be used for example for grasping the edges of the container when opening or closing the container. FIG. 12 illustrates an embodiment of the invention with a top flap 1210 and a bottom flap 1211. In some embodiments the shapes and sizes of the top flap and the bottom flap, if both are present, may be different. This is illustrated in FIG. 12 where top flap 1210 forms an arc extending from approximately the middle third of the top front edge, while bottom flap 1211 extends along the entire bottom front edge.

Figure 13:
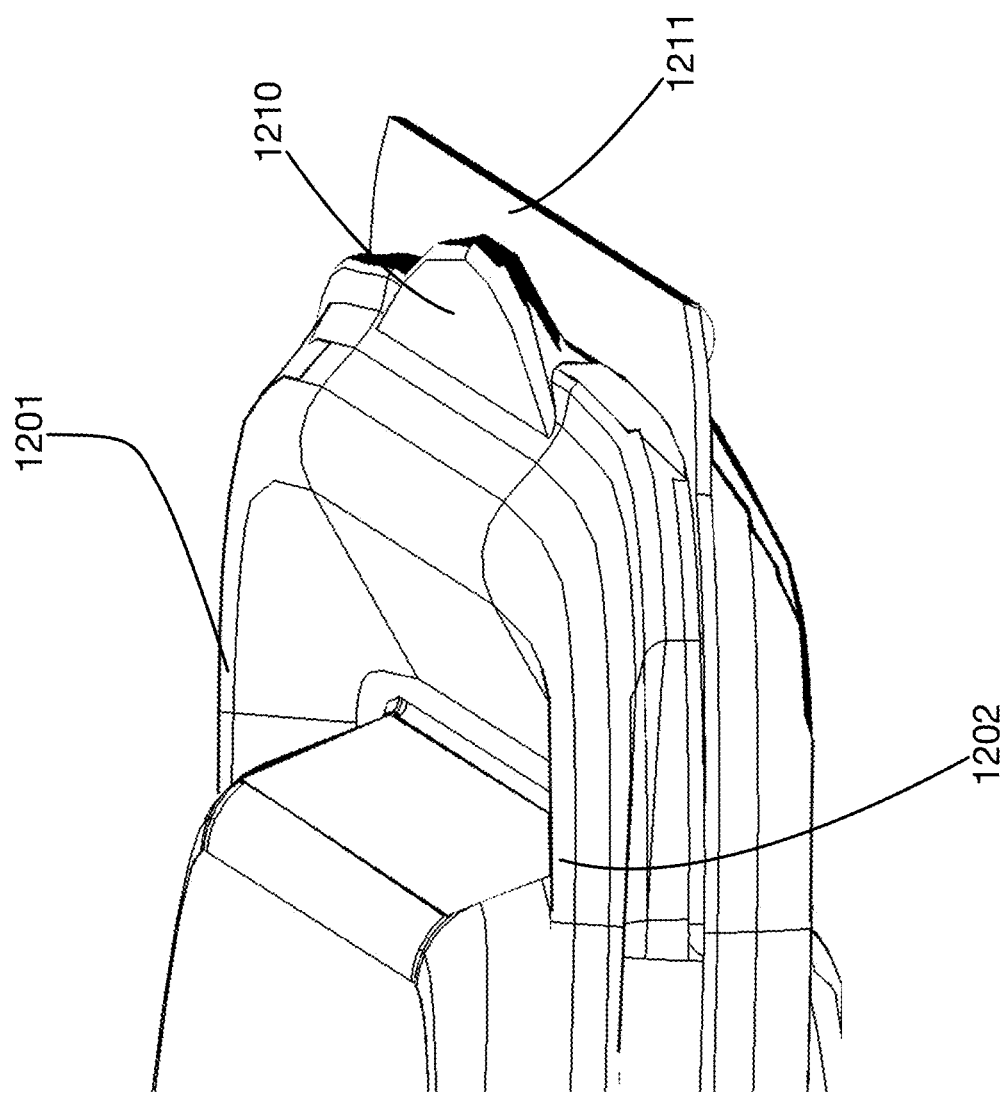
FIG. 13 shows a close-up view of the front of the embodiment shown in FIG. 12.

FIG. 13 shows a close-up view of the front of the embodiment illustrated in FIG. 12, shown in the closed position. As illustrated in FIG. 13, in this embodiment the bottom flap 1211 extends further forward than top flap 1210. Embodiments that employ flaps of different sizes may facilitate opening by making it easier for a user to grasp one of the flaps to begin opening. Different embodiments may use different sizes and shapes of flaps, including symmetric designs with similar shapes for top and bottom flaps, and asymmetric designs as illustrated in FIG. 13.

FIG. 14 illustrates an embodiment of the invention with a vertical gap between the top flap and the bottom flap, to facilitate grasping the flaps for opening. In this embodiment top flap 1210 has a curved form that is vertically offset from bottom flap 1211 by distance 1401. This shape may make it easier for a user to insert his or her fingers into the space between the flaps. In this embodiment bottom flap 1211 has a series of ridges running parallel to the front edge of the container, to aid in grasping the flap. In the embodiment shown in FIG. 14, the press-fit elements are located along the front edges and also along the front portions of the left and right edges. Top press-fit element 231 has portion 1201 that is proximal to left side 112, and portion 1202 that is proximal to right side 113. Similarly, the bottom press-fit element extends to the left edge and the right edge. In this embodiment, the press-fit elements curve around the corners between the front edge and the left and right edges.

One or more embodiments of the invention incorporate pressure shield elements in front of or otherwise added to the inside of the container having the seal. These elements greatly increase the ability of the seal to remain closed without leaking when subjected to internal pressures that may result from external forces imparted to the outer portion of the container, e.g., when the container is squeezed or dropped. For example, if the elastomeric container is filled with a liquid and is then dropped or moved quickly the motion of the liquid may generate significant internal pressure outward on the walls of the container and the seal depending on the direction of force. Sufficient outward pressure causes the seal to disengage causing a leak, however with the pressure shield, embodiments of the leak resistant seal do not peel open when the force if directed at the pressure shield with a much higher pressure than embodiments that do not employ the pressure shield. The inventors have discovered the surprising result that by adding a small amount of material to the container in the form of a pressure shield in certain geometric proportions, for example approximately 5% in a medium sized container, that the leak resistance increases by at least 300% and in some embodiments at least 400%, specifically without adding material to the engaging portion of the seal itself.

Figure 15A:
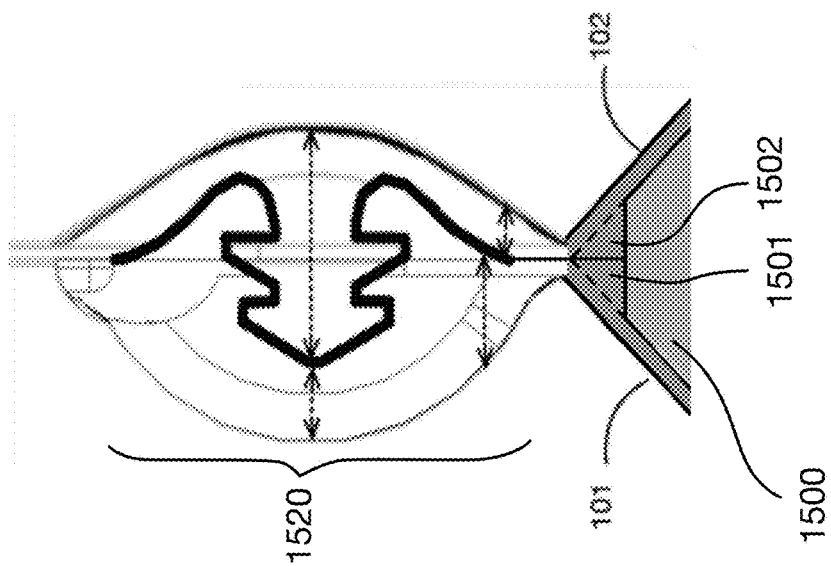
FIGS. 15A and 15B show seals used in the prior art to contain liquids within containers.
Figure 15B:
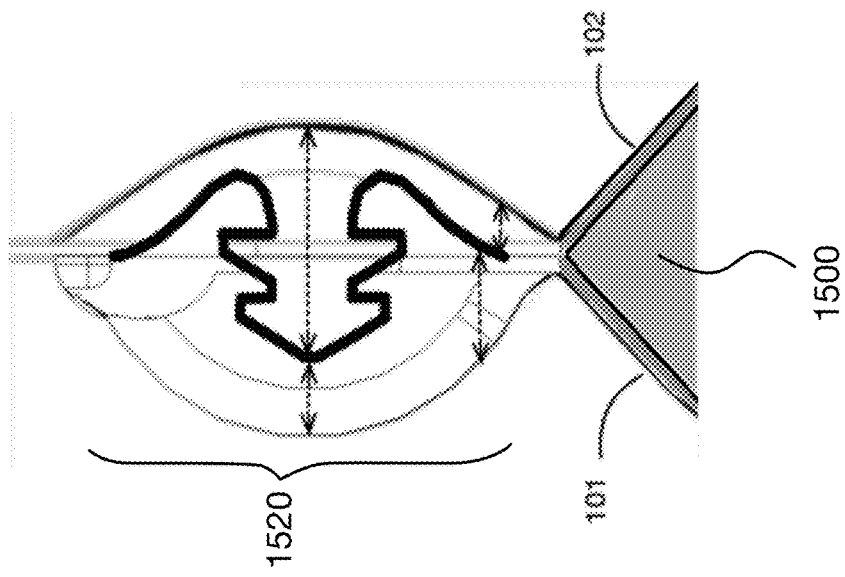
Figure 15C:
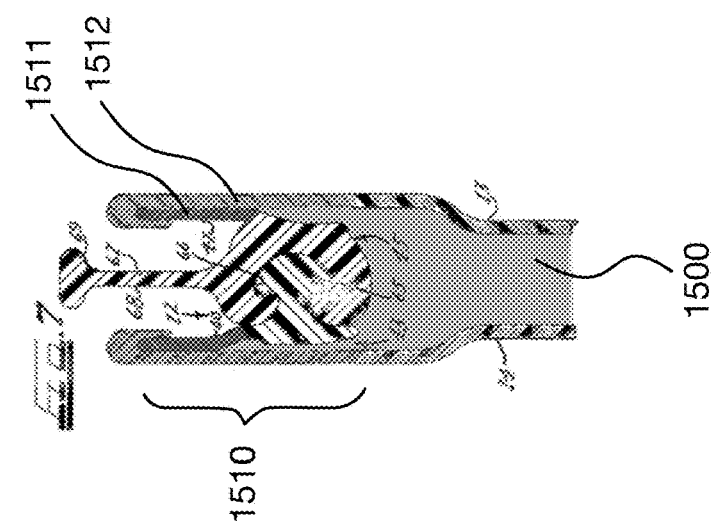
FIG. 15C shows a seal from an embodiment of the invention with greatly improved leak resistance.

FIGS. 15A, 15B, and 15C illustrate two prior art seals and the improvement to the seal with the addition of pressure resisting elements respectively. Specifically, FIGS. 15A and 15B represent seals known in the prior art, as described in the Description of the Related Art section. FIG. 15C shows an illustrative embodiment of the reinforced seal of the present invention, with the added pressure shield elements 1501 and 1502, located between the press-fit seal elements 1520 and the liquid (or other) contents of the container 1500. These elements 1501 and 1502 are not present in the seal 1520 in FIG. 15B of applicant's prior '153 Patent, nor do they appear in other prior art seals such as the seal of FIG. 15A. Pressure that is imparted upon the substantially planar portion of this area (shown beneath where these two elements meet) spreads across a much larger area instead of funneling toward the press-fit elements in the seal 1520 of the Applicant's prior '153 Patent as previously described. Embodiments of the seal in FIG. 15C are at least 300% or in some embodiments, 400% more leak resistant to liquids from the internal portion of the container than that of FIG. 15B as taught in the '153 Patent, which is surprising given the small amount of extra material utilized and which is negligible with respect to the total amount of material utilized in the container.

FIG. 16A shows details of an illustrative embodiment of a seal with pressure resisting elements as described with respect to FIG. 15C. The figure shows a cross sectional view of a portion of the front edge of the container, with the enclosed volume of the container to the left and the seal to the right along the front edge. All elements shown may be elastomeric, for example. The seal includes top press-fit element 231, bottom press-fit element 232, with an added top pressure shield element 1501 and bottom pressure shield element 1502. The top pressure shield 1501 has a bottom surface 1601*h* that contacts the top surface 1602*h* of the bottom pressure shield 1502 when the seal is closed; these surfaces 1601*h* and 1602*h* may be relatively flat and roughly parallel to the center horizontal plane 401 of the enclosure in one or more embodiments.

Both pressure shield portions also have inner surfaces that face the inner volume of the enclosure. Top pressure shield 1501 has inner surface 1601*v*, and bottom pressure shield 1602 has inner surface 1602*v*. These inner surfaces may be substantially flat in one or more embodiments and may be substantially perpendicular to the center horizontal plane 401. Because they are substantially flat surface, pressure from the contents of the enclosure is spread across the pressure shield portions, thereby reducing the tendency of this pressure to force open the sealing elements 231 and 232. For example, pressure 1611 on the inner surface 1601v is resisted by a response force 1621 from the top pressure shield, and pressure 1612 on the inner surface 1602v is resisted by a response force 1622 from the bottom pressure shield. Inner surfaces 1601v and 1602v may be any shape other than substantially planar insofar as the portions are not concave as shown in inventor's prior '153 design at FIG. 15B and are not convex to the point of putting pressure on the seal by allowing liquid to traverse around the sides of the engaging portion of the seal as shown in FIG. 15A. Thus, inner surfaces 1601v and 1602v are not required to be flat and orthogonal to the center plane but could meet at a non-zero angle and be flat or curved surfaces.

Figure 16B:
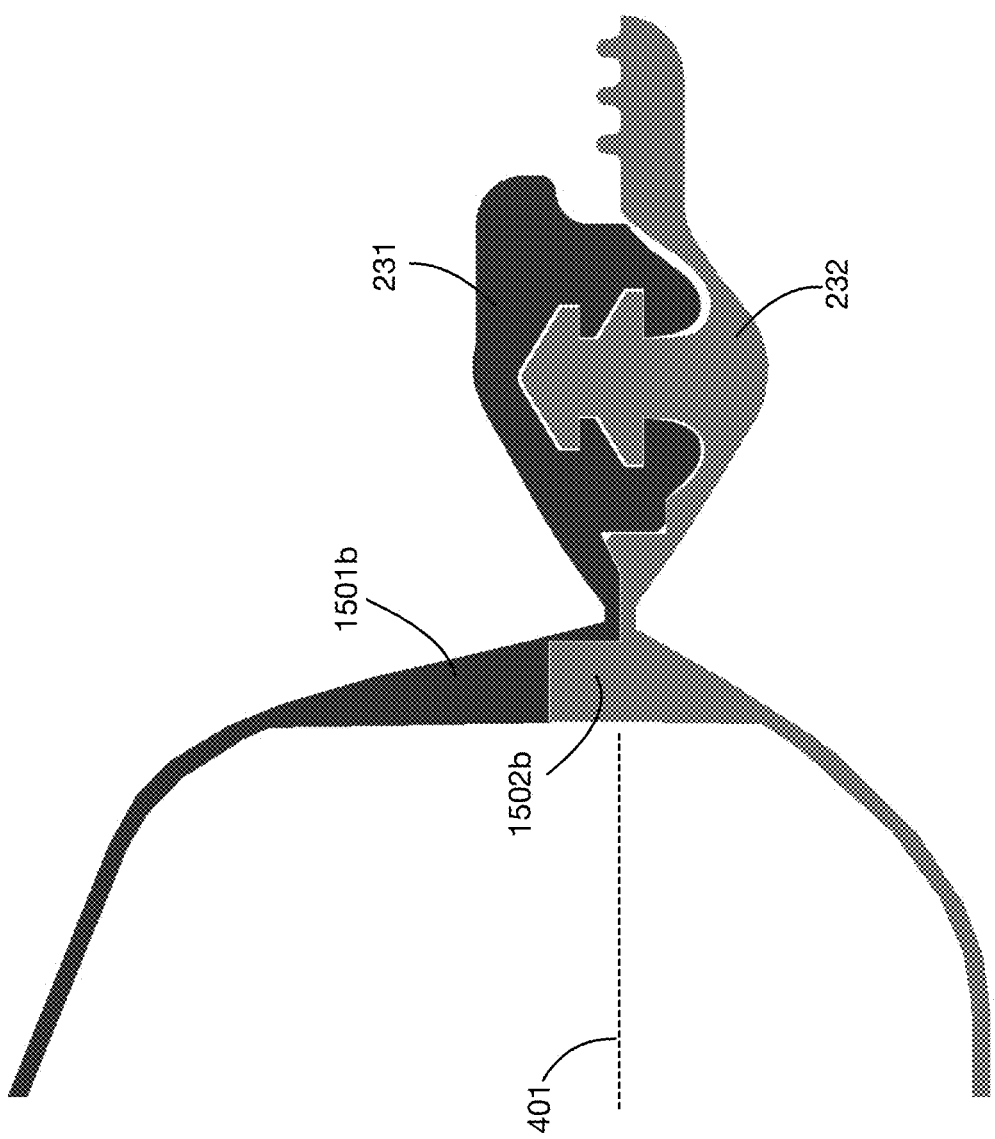
FIG. 16B shows a variation of the embodiment of FIG. 16A with a modified geometry for the pressure resisting elements that includes a step.

FIG. 16B shows a variation of the embodiment of FIG. 16A with a slightly different geometry for the pressure shields that includes step 1502b. In this embodiment, bottom pressure shield 1502 has a portion that extends above center horizontal plane 401, and top pressure shield 1501b has a corresponding notch that mates with this portion. The shapes of the pressure shields in FIGS. 16A and 16B are illustrative; one or more embodiments may use pressure shields of different sizes and shapes than those shown.

Figure 16C:
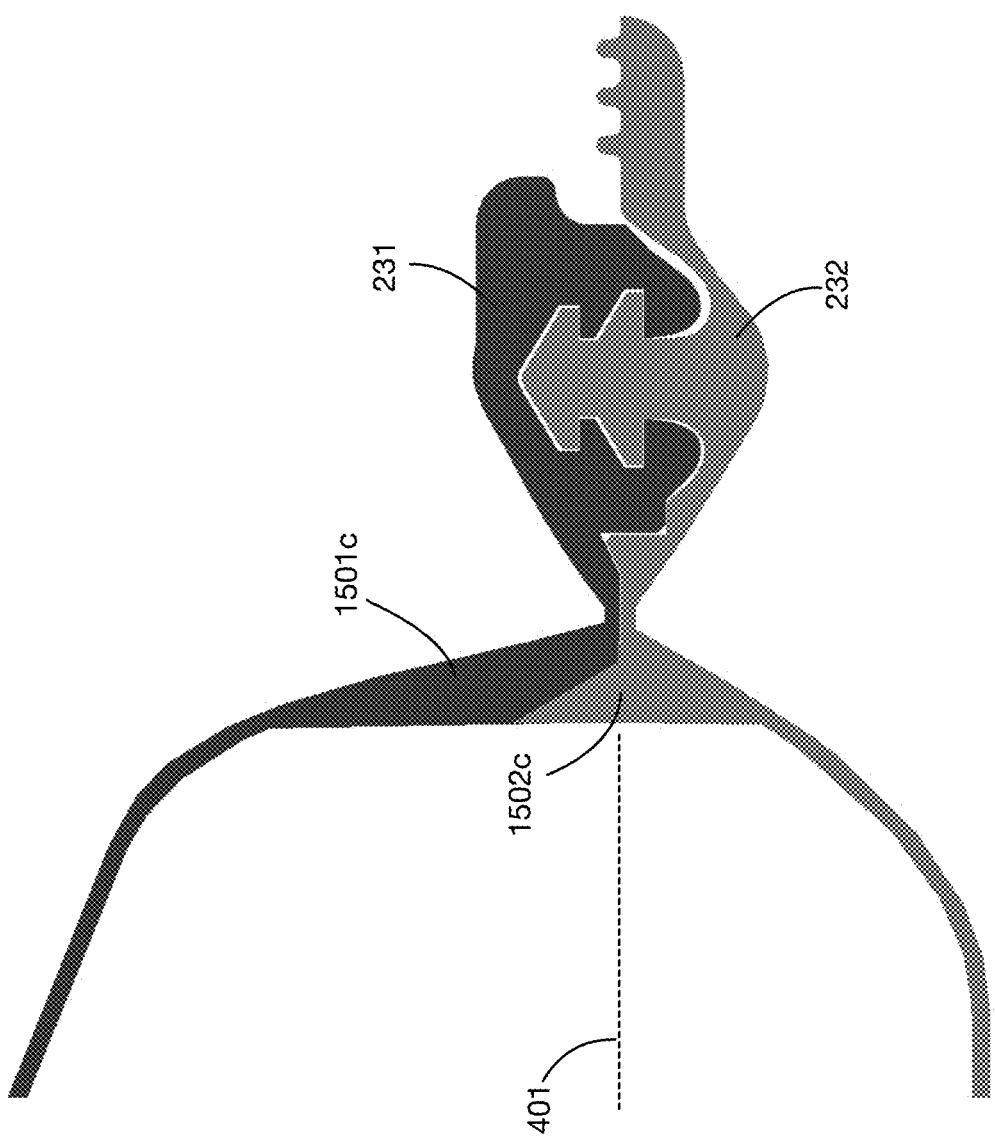
FIG. 16C shows a variation of the embodiment of FIG. 16A with a modified geometry for the pressure resisting elements that includes a ramp.

FIG. 16C shows a variation of the embodiment of FIG. 16A with a modified geometry for the pressure resisting elements that includes a ramp 1502c. The junction of 1501c and 1502c is also configured to prevent pressure from peeling open elements 231 and 232 from one another.

Figure 16D:
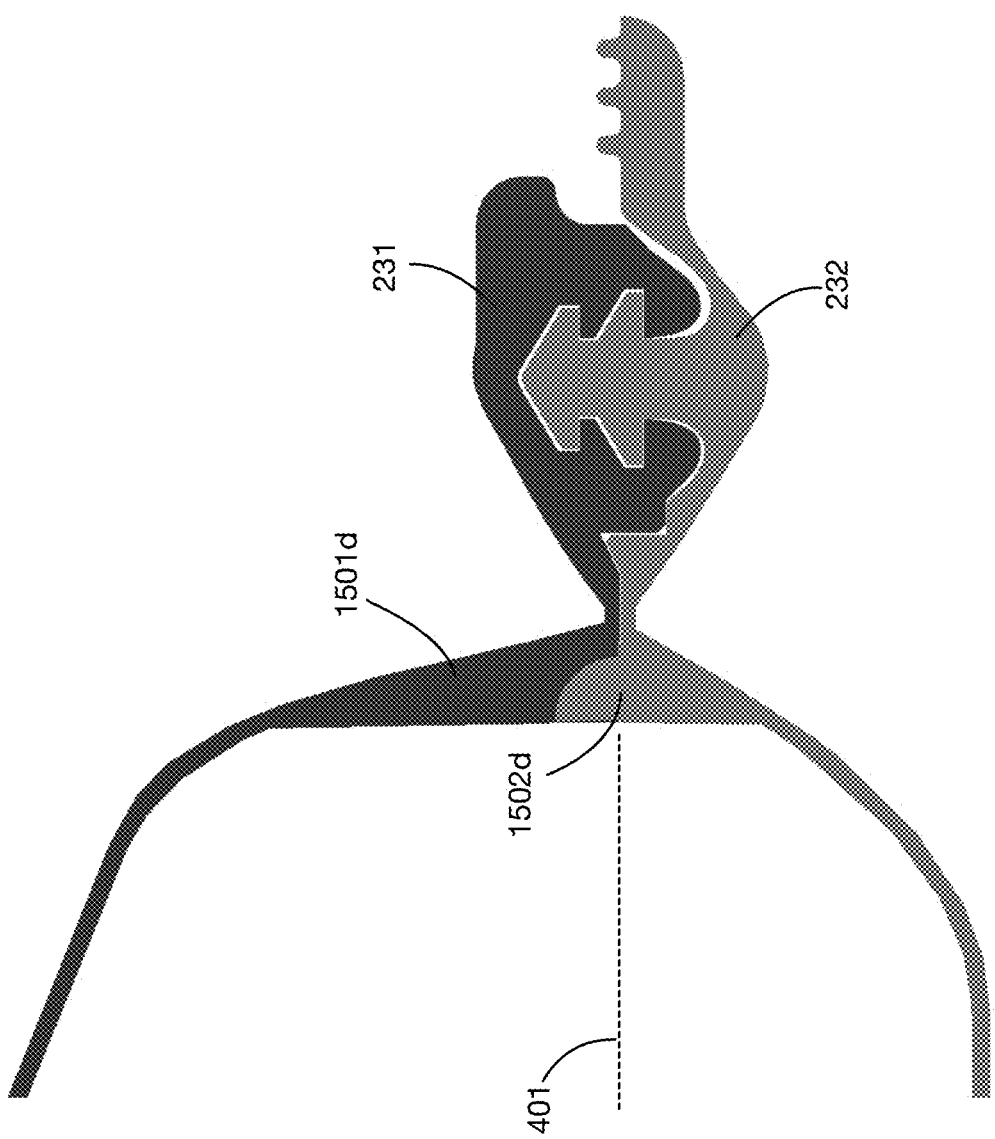
FIG. 16D shows a variation of the embodiment of FIG. 16A with a modified geometry for the pressure resisting elements that includes a curved surface.

FIG. 16D shows a variation of the embodiment of FIG. 16A with a modified geometry for the pressure resisting elements that includes a curved surface internal to the pressure shield. The junction of 1501d and 1502d is also configured to prevent pressure from peeling open elements 231 and 232 from one another.

Figure 16E:
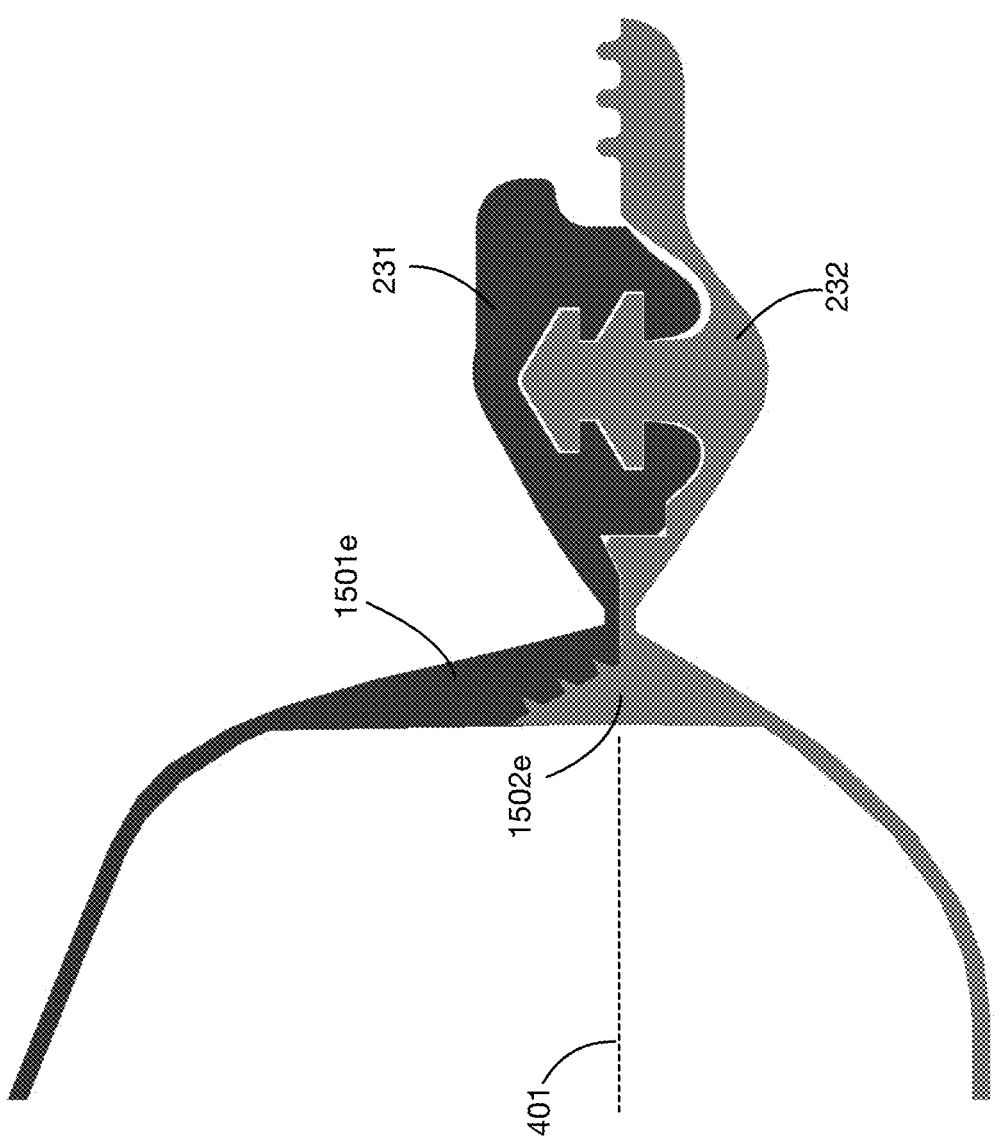
FIG. 16E shows a variation of the embodiment of FIG. 16A with a modified geometry for the pressure resisting elements that includes a ramp with teeth.

FIG. 16E shows a variation of the embodiment of FIG. 16A with a modified geometry for the pressure resisting elements that includes a ramp with teeth. The junction of 1501e and 1502e is also configured to prevent pressure from peeling open elements 231 and 232 from one another.

Figure 16F:
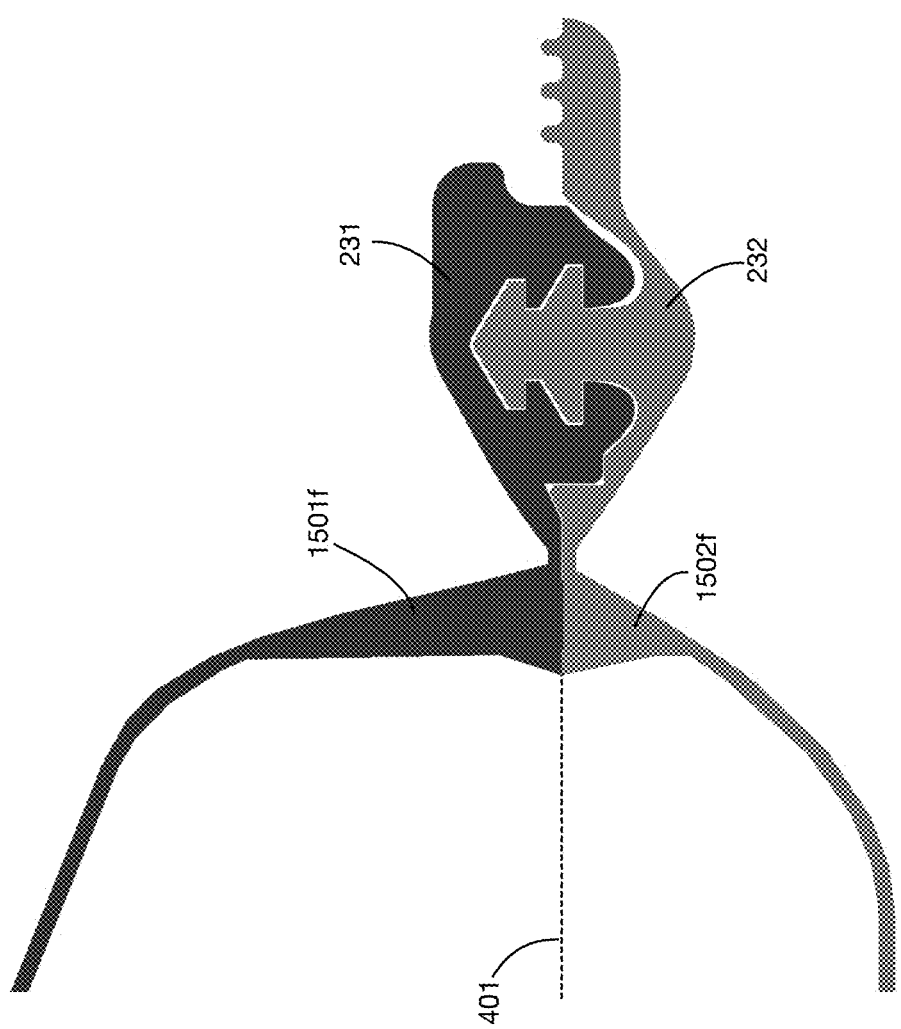
FIG. 16F shows a variation of the embodiment of FIG. 16A with a modified geometry for the pressure resisting elements that includes a non-linear shape.

FIG. 16F shows a variation of the embodiment of FIG. 16A with a modified geometry for the pressure resisting elements that includes a non-linear shape. The junction of 1501f and 1502f is also configured to prevent pressure from peeling open elements 231 and 232 from one another and deflects pressure away from the junction of pressure resisting elements 1501f and 1502f.

Figure 17:
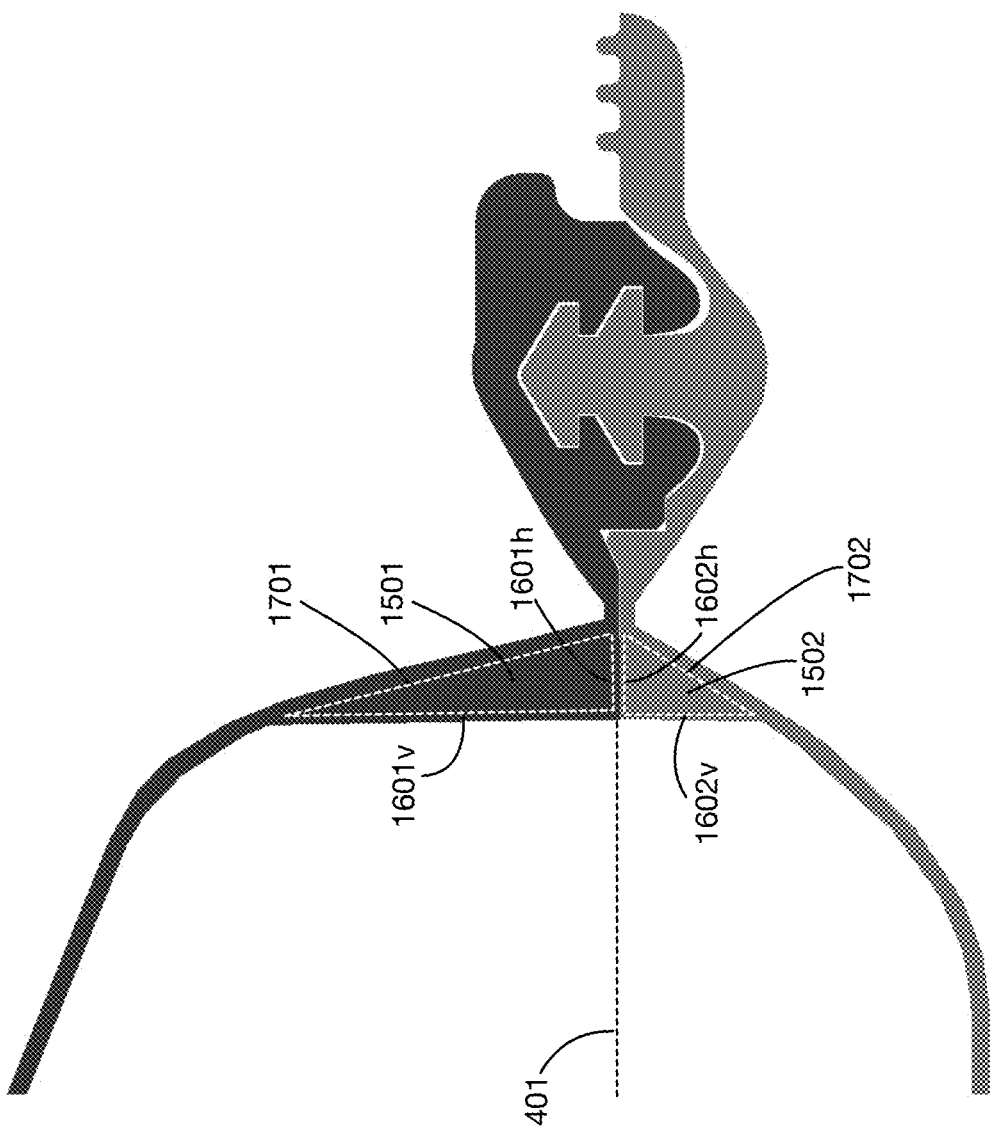
FIG. 17 shows an embodiment of the invention with wedge-shaped pressure resisting elements that have cross sections that are approximately right triangles.

In the embodiment shown in FIG. 17, the pressure shields are roughly wedge-shaped strips that run along the front edge of the elastomeric container. These wedges have cross-sectional areas that are approximately right triangles. As shown, the cross-sectional area of top pressure shield 1501 approximately equal to right triangle 1701, and the cross-sectional area of bottom pressure shield 1502 approximately equal to right triangle 1702. In the embodiment shown, triangle 1701 is taller than but the same width as triangle 1702. One or more embodiments may use pressure shields with non-triangular cross sections as shown in FIGS. 16B-E, or with triangular cross sections of any desired relative sizes (see FIG. 15C versus FIG. 18).

Figure 18:
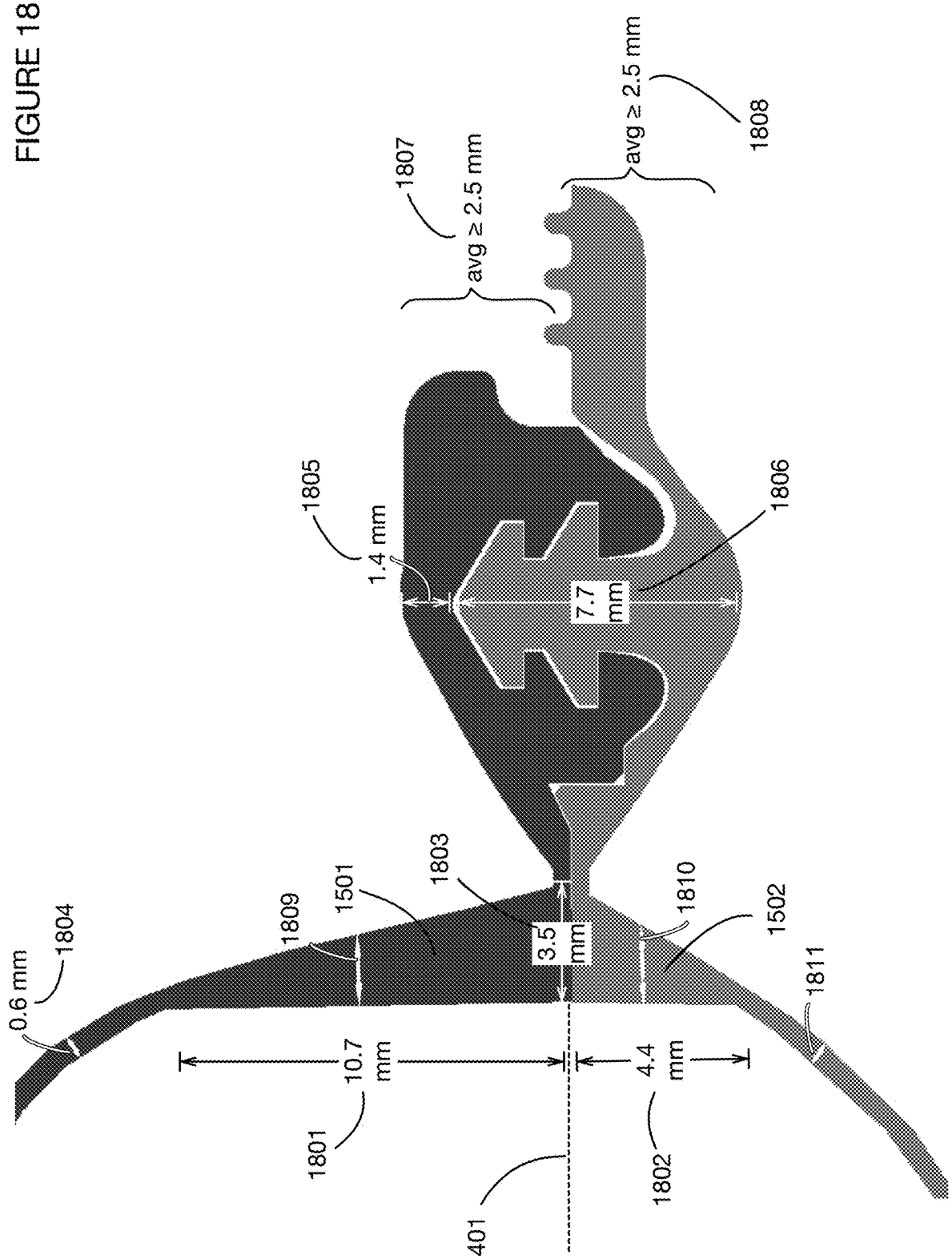
FIG. 18 shows illustrative dimensions for sealing and pressure resisting elements for an embodiment of the invention.

FIG. 18 shows dimensions for an illustrative embodiment of the invention. The inner surface of top pressure shield 1501 has length 1801, and the bottom surface has width 1803. The inner surface of bottom-pressure shield 1501 has length 1802, and the top surface has width 1803. Since the top and bottom pressure shields 1501 and 1502 are approximately triangular, their average thickness (along the horizontal axis 401) is approximately half of length 1803. or approximately 1.75 millimeters, wherein the height of the respective pressure shield sides are 10.7 mm+4.4 mm or about 15 mm. An average thickness 1809 of the top pressure shield 1501 and an average thickness 1810 of the bottom pressure shield 1502 are also shown. The walls of the enclosure (not including the sealing elements such as the press-fit elements or the pressure shields) have an average top thickness 1804, and an average bottom thickness 1811. In this embodiment, the average thickness of the two pressure shields is therefore greater than 2.5 times the average thickness 1804 of the enclosure walls. However, in total the pressure shields represent a relatively small amount of material added to the seal. The horizontal legs of the triangular cross sections, with length 1803, are less than 0.5 cm, and the vertical legs of the triangular cross sections, with lengths 1801 and 1802, are each less than 1.5 cm. With respect to the amount of added material, in the embodiment shown with wall thicknesses 1804 of 0.6 mm, the amount of added material that makes up the pressure shield portions, namely 1601v and 1602v (shown in FIG. 17), the amount of material is approximately ½*width*height of each respective triangle, i.e., ½*2.5 mm*10.7 mm, or 13.4 mm^2 and ½*2.5 mm*4.4 mm, or 5.5 mm^2. The two pressure shield portions add up to 18.9 mm^2 whereas in the leak resistant seal itself there is over 90 mm^2 of material in cross section as shown. For example, for a container embodiment having a height of 175 mm, depth of 50 mm with wall thickness of 0.6 mm, the amount of material in cross section is approximately 2*height+2*depth, or 450 mm in length, multiplied by the wall thickness, which yields 270 mm^2, when added to the cross section of the seal, yields 360 mm^2. Thus, the pressure shield portions, which add to 18.9 mm^2 is roughly a 5% increase in material used in the container, for at least a 300% increase in leak resistance. Stand up versions of the containers with thicker walls have a higher amount of material overall, and thus the amount of extra material required for a container with walls twice as thick is less than 2.5%.

Illustrative dimensions are also shown for the top and bottom press-fit elements. The maximum thickness (in the vertical direction) of the bottom press-fit element is length 7.7 mm as shown at 1806, and the average thickness is at least 2.5 mm as shown at 1808. The minimum thickness of the top press-fit element is 1.4 mm as shown at 1805, and the average thickness is at least 2.5 mm as shown at 1807.

Figure 19A:
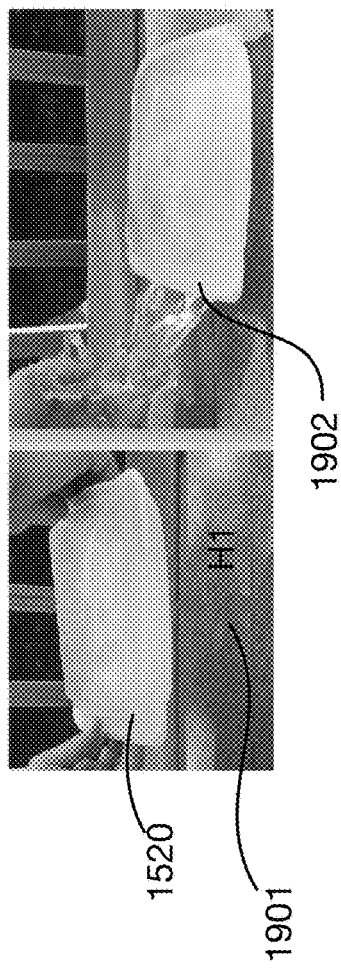
FIGS. 19A and 19B contrast the sealing performance of the prior art seal of FIG. 15B and an embodiment of the invention (such as those illustrated in FIGS. 15C through 18) respectively.
Figure 19B:
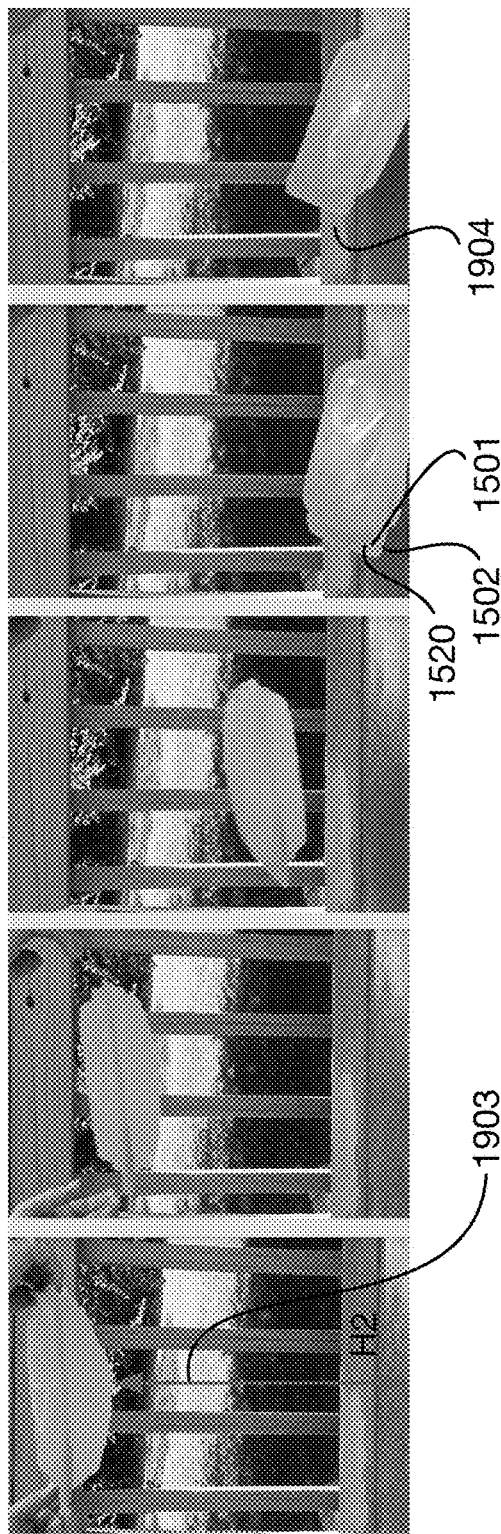

FIGS. 19A and 19B show illustrative performance of an embodiment of the invention compared to the prior art. FIG. 19A shows two frames of a video of an enclosure with seal 1520 (as in FIG. 15B) filled with liquid and dropped from height H1 as shown in the leftmost frame at 1901, which is approximately 4 inches. A seal failure 1902 occurs upon impact as shown in the right frame, and liquid escapes from the enclosure. FIG. 19B shows five frames of a video of an enclosure having seal 1520 and top and bottom pressure shields 1501 and 1502 (as shown in FIG. 15C) filled with liquid and dropped from a height H2 as shown at 1903, which is approximately 16 inches, 4 times higher than in FIG. 19A. At impact 1904, the seal and pressure shields hold the enclosure closed and no liquid escapes.

Figure 20:
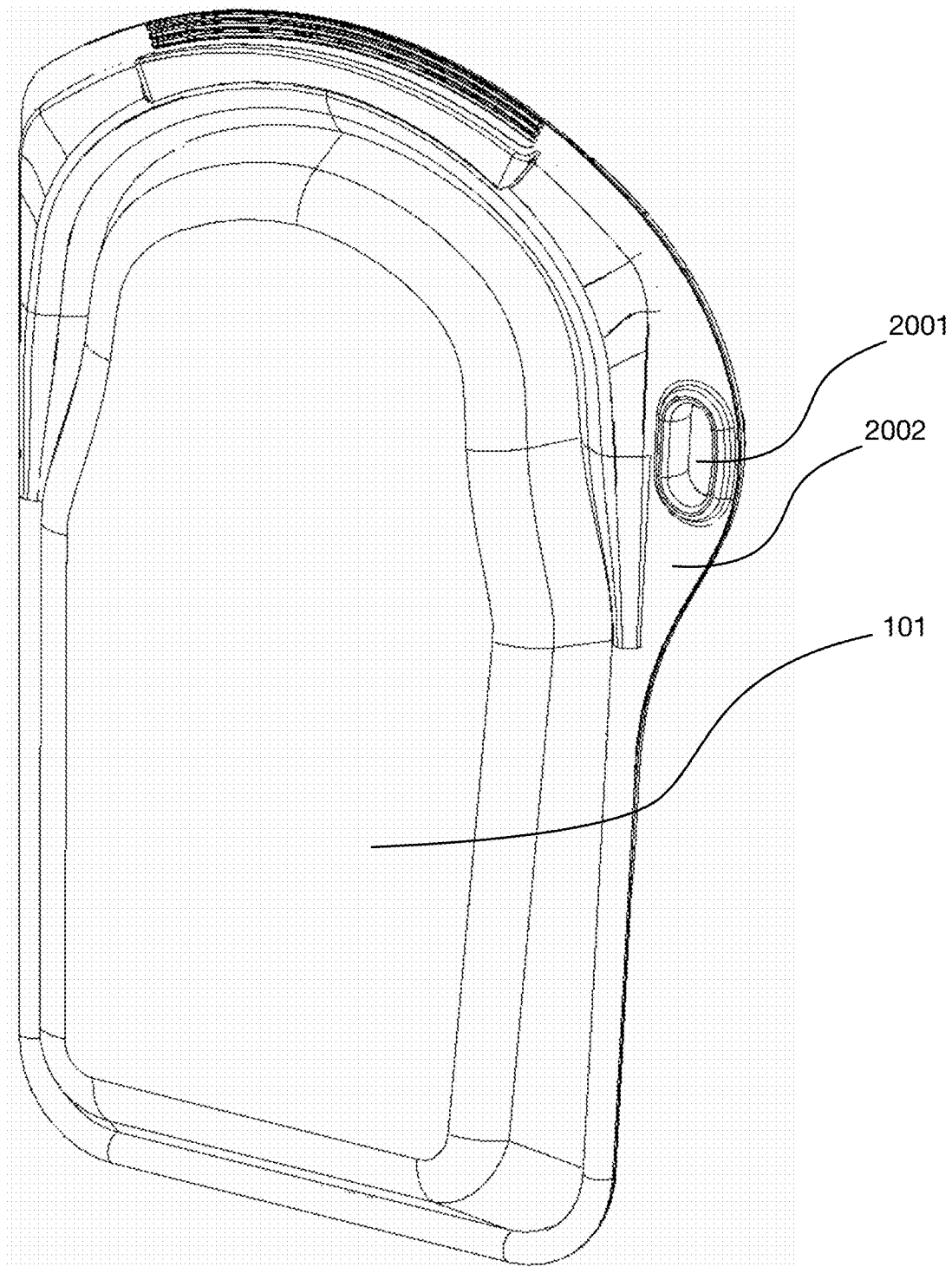
FIG. 20 shows an embodiment of the container that includes an outer hole also known as a connection hole that enables coupling the embodiments to another object, for example through the use of a carabiner or other device.

FIG. 20 shows an embodiment of the container that comprises support 2002 having hole 2001, for example which can be an outer hole also known as a connection hole from which to couple the shape elastomeric container to an external object. For example, embodiments of the invention may be coupled to an external object via hole 2001 through the use of a carabiner, clip, rope, elastic band, ring or other device.

Definitions

Elastomer—A material which at room temperature can be stretched repeatedly to at least twice its original length and, upon immediate release of the stress, will return with force to its approximate original length.

Boundary—A length of a surface of either the first seal portion or second seal portion between an initial point of contact and final point of contact between the first seal portion and second seal portion when the leak resistant seal is closed. In a seal profile with no gaps, the boundary is the same length whether measured along the surface of element 1601 or 1602. In a seal profile with gaps, the boundary used for calculations of the path is either that length of the surface of either the first seal portion or second seal portion, wherein the female portion in general will have a larger boundary in a seal having gaps where no contact exists between some portions of the seal. Either the larger number or smaller number in this case can be utilized to show the length of the path. See also FIGS. 16A-B.

Leak resistant seal—A seal that resists leakage of liquids and solids from the container during storage and transport without the aid of an external structure to maintain the seal.

Coupled to—In terms of a single container, the container may be made in an integrated mold wherein all parts of the container are formed and therefore coupled to one another during the molding process, wherein the coupling material is the container material itself, i.e., an elastomer or plastic or thermoplastic elastomer. The single container may also be made from parts formed before coupling the parts together to form a single container. In either case a single container has multiple parts that are all coupled together, or they would fall apart.

Corresponding indentations—The shapes of the protrusions and recesses may be of the same shape where there are no gaps in the seal or may be of different shapes if the seal has gaps, e.g., when closed. In addition, the protrusions and recesses may be of different shapes so that when closed, there is at least one contact boundary along the length of the seal. In either case, the corresponding indentations for ridges may be of the same shape or different shape. These elements allow the press-fit elements to lock with one another, i.e., via vertically offset ridges that fit into these corresponding indentations.

While the ideas herein disclosed have been described by means of specific embodiments and applications thereof, numerous modifications and variations could be made thereto by those skilled in the art without departing from the scope of the invention set forth in the claims.

What is claimed is:

1. An elastomeric container, comprising:
   a top enclosure and a bottom enclosure that each comprise an elastomer, wherein the top enclosure and the bottom enclosure are configured to provide an inner volume of the elastomeric container, wherein each of the top enclosure and the bottom enclosure comprises an edge; and
   a seal comprising the elastomer and configured to open and close the elastomeric container, the seal comprising:
   a bottom press-fit element and a top press-fit element;
   a bottom pressure shield disposed between the bottom press-fit element and the inner volume, the bottom pressure shield comprising a bottom pressure shield top surface and a bottom pressure shield inner surface in direct contact with the inner volume, the bottom pressure shield defined by an upper thickness and a lower thickness; and
   a top pressure shield disposed between the top press-fit element and the inner volume, the top pressure shield comprising a top pressure shield bottom surface and a top pressure shield inner surface in direct contact with the inner volume,
   wherein the top enclosure and the bottom enclosure define a center horizontal plane where the top enclosure and the bottom enclosure meet,
   wherein, in cross section, a thickness of the top pressure shield continuously increases along the entire top pressure shield inner surface, and, in cross section, the lower thickness of the bottom pressure shield continuously decreases along the entire bottom pressure shield inner surface beneath the center horizontal plane,
   wherein the bottom pressure shield includes one or more pressure resisting elements that extend at least partially across the center horizontal plane along an inner profile of the inner volume of the elastomeric container, and the top pressure shield does not extend across the center horizontal plane,
   wherein the upper thickness of the bottom pressure shield is constant above the center horizontal plane, and
   wherein the bottom pressure shield top surface at least partially contacts the top pressure shield bottom surface when the seal is closed.

2. The elastomeric container of claim 1, wherein the one or more pressure resisting elements includes a rectangular cross-section.

3. The elastomeric container of claim 1, wherein the top pressure shield has a top length that extends along the top pressure shield inner surface, and the bottom pressure shield has a bottom length that extends along the bottom pressure shield inner surface,
   wherein the top length is less than the bottom length.

4. The elastomeric container of claim 1, wherein the seal includes a gap between a first contact point of the seal and a second contact point of the seal when the seal is closed.

5. The elastomeric container of claim 1, wherein the top pressure shield inner surface and the bottom pressure shield inner surface are perpendicular with respect to the center horizontal plane when the seal is closed.

6. The elastomeric container of claim 1, wherein the top pressure shield bottom surface is parallel with respect to the center horizontal plane.

7. The elastomeric container of claim 1 further comprising a top flap extending forward from the top press-fit element and along the edge and a bottom flap extending forward from the bottom press-fit element and along the edge.

8. The elastomeric container of claim 7, wherein the top flap and the bottom flap are vertically offset by a distance, wherein the distance is at least a height of a ridge of the bottom flap.

9. The elastomeric container of claim 1 further comprising a hole along the edge.

10. An elastomeric container, comprising:
    a top enclosure and a bottom enclosure that each comprise an elastomer, wherein the top enclosure and the bottom enclosure are configured to provide an inner volume of the elastomeric container; and
    a seal comprising the elastomer and configured to open and close the elastomeric container, the seal comprising:

a bottom press-fit element and a top press-fit element;

a bottom pressure shield disposed between the bottom press-fit element and the inner volume, the bottom pressure shield comprising a bottom pressure shield top surface and a bottom pressure shield inner surface in direct contact with the inner volume, the bottom pressure shield defined by an upper thickness and a lower thickness; and a top pressure shield disposed between the top press-fit element and the inner volume, the top pressure shield comprising a top pressure shield bottom surface and a top pressure shield inner surface in direct contact with the inner volume, wherein the top enclosure and the bottom enclosure define a center horizontal plane where the top enclosure and the bottom enclosure intersect, wherein, in cross section, a thickness of the top pressure shield continuously increases along the entire top pressure shield inner surface, and, in cross section, the lower thickness of the bottom pressure shield continuously decreases along the entire bottom pressure shield inner surface beneath the center horizontal plane, wherein the upper thickness of the bottom pressure shield is constant above the center horizontal plane, and wherein the bottom pressure shield top surface at least partially contacts the top pressure shield bottom surface when the seal is closed.

11. The elastomeric container of claim 10, wherein the bottom pressure shield includes one or more pressure resisting elements that extend at least partially across the center horizontal plane along an inner profile of the inner volume of the elastomeric container, and the top pressure shield does not extend across the center horizontal plane.

12. The elastomeric container of claim 11, wherein the one or more pressure resisting elements includes a rectangular cross-section.

13. The elastomeric container of claim 10, wherein the top pressure shield has a top length that extends along the top pressure shield inner surface, and the bottom pressure shield has a bottom length that extends along the bottom pressure shield inner surface, wherein the top length is less than the bottom length.

14. The elastomeric container of claim 10, wherein the seal includes a gap between a first contact point of the seal and a second contact point of the seal when the seal is closed.

15. The elastomeric container of claim 10, wherein the top pressure shield inner surface and the bottom pressure shield inner surface are perpendicular with respect to the center horizontal plane when the seal is closed.

16. An elastomeric container, comprising:

a top enclosure and a bottom enclosure that each comprise an elastomer, wherein the top enclosure and the bottom enclosure are configured to provide an inner volume of the elastomeric container; and a seal comprising the elastomer and configured to open and close the elastomeric container, the seal comprising:

a bottom pressure shield that comprises a bottom pressure shield top surface and a bottom pressure shield inner surface in direct contact with the inner volume, the bottom pressure shield defined by an upper thickness and a lower thickness; and a top pressure shield that comprises a top pressure shield bottom surface and a top pressure shield inner surface in direct contact with the inner volume, wherein the top enclosure and the bottom enclosure define a center horizontal plane at an intersection therebetween, wherein, in cross section, a thickness of the top pressure shield continuously increases along the entire top pressure shield inner surface, and, in cross section, the lower thickness of the bottom pressure shield continuously decreases along the entire bottom pressure shield inner surface beneath the center horizontal plane, wherein the upper thickness of the bottom pressure shield is constant above the center horizontal plane, and wherein the bottom pressure shield top surface at least partially contacts the top pressure shield bottom surface when the seal is closed.

17. The elastomeric container of claim 16, wherein the bottom pressure shield includes one or more pressure resisting elements that extend at least partially across the center horizontal plane along an inner profile of the inner volume of the elastomeric container, and the top pressure shield does not extend across the center horizontal plane.

18. The elastomeric container of claim 17, wherein the one or more pressure resisting elements includes a rectangular cross-section.

19. The elastomeric container of claim 16, wherein the seal includes a gap between a first contact point of the seal and a second contact point of the seal when the seal is closed.

20. The elastomeric container of claim 16, wherein the seal further comprises a top press-fit element and a bottom press-fit element.

* * * * *